(12) United States Patent
Lozano

(10) Patent No.: US 9,501,891 B2
(45) Date of Patent: Nov. 22, 2016

(54) SYSTEM AND METHOD FOR GENERATING CUSTOMIZED CRAYON LABELS

(71) Applicant: CRAYOLA, LLC, Easton, PA (US)

(72) Inventor: Victoria B. Lozano, Easton, PA (US)

(73) Assignee: Crayola, LLC, Easton, PA (US)

( * ) Notice: Subject to any disclaimer, the term of this patent is extended or adjusted under 35 U.S.C. 154(b) by 0 days.

(21) Appl. No.: 14/712,346

(22) Filed: May 14, 2015

(65) Prior Publication Data

US 2015/0332367 A1 Nov. 19, 2015

Related U.S. Application Data

(60) Provisional application No. 61/993,683, filed on May 15, 2014.

(51) Int. Cl.
| | |
|---|---|
| *G06Q 30/06* | (2012.01) |
| *G06Q 20/18* | (2012.01) |
| *G07F 11/00* | (2006.01) |
| *G07F 11/70* | (2006.01) |
| *G07F 17/42* | (2006.01) |
| *G07F 11/58* | (2006.01) |

(52) U.S. Cl.
CPC ............. *G07F 11/70* (2013.01); *G06Q 20/18* (2013.01); *G06Q 30/06* (2013.01); *G06Q 30/0621* (2013.01); *G07F 11/00* (2013.01); *G07F 11/58* (2013.01); *G07F 17/42* (2013.01)

(58) Field of Classification Search
CPC .. G06Q 30/0621; G06Q 20/18; G07F 17/42; G07F 11/70
USPC .................................................. 700/233, 235
See application file for complete search history.

(56) References Cited

U.S. PATENT DOCUMENTS

| | | | | |
|---|---|---|---|---|
| 5,002,182 A | * | 3/1991 | McGinnis | A45C 11/34 144/28.1 |
| 5,069,361 A | * | 12/1991 | Jeffway, Jr. | A45C 11/24 206/214 |
| 5,240,143 A | * | 8/1993 | Kornegay | G07F 11/045 221/202 |
| 5,547,106 A | * | 8/1996 | Samonsky | G07F 11/20 221/193 |
| 5,590,811 A | * | 1/1997 | Hill | B43K 23/04 221/66 |
| 2009/0248199 A1 | * | 10/2009 | Milhorn | B01F 13/1055 700/239 |
| 2013/0117137 A1 | * | 5/2013 | Klein | G07F 17/16 705/16 |
| 2014/0094964 A1 | * | 4/2014 | Bartholomew | G07F 11/165 700/233 |
| 2014/0277704 A1 | * | 9/2014 | Memar | B01F 13/1063 700/233 |
| 2015/0182006 A1 | * | 7/2015 | Blaze | A45D 44/005 700/233 |

* cited by examiner

*Primary Examiner* — Michael K Collins
(74) *Attorney, Agent, or Firm* — Shook, Hardy & Bacon L.L.P.

(57) ABSTRACT

A customized crayon label creation and dispensing system and methods are provided. The system may include an activation component, a user interface, a printing component, a label generating component, and a crayon dispensing component. In embodiments, the system dispenses a customized crayon label and a crayon body in response to receipt of an indication of activation (e.g., a token) and indications from a user interface. The indications from a user interface may include crayon label template selections and input user content to be included in the generated customized crayon label. The generated customized crayon label and a corresponding crayon body are dispensed. In some embodiments, instructions are provided to a user for wrapping the dispensed crayon body with the generated customized crayon label.

20 Claims, 12 Drawing Sheets

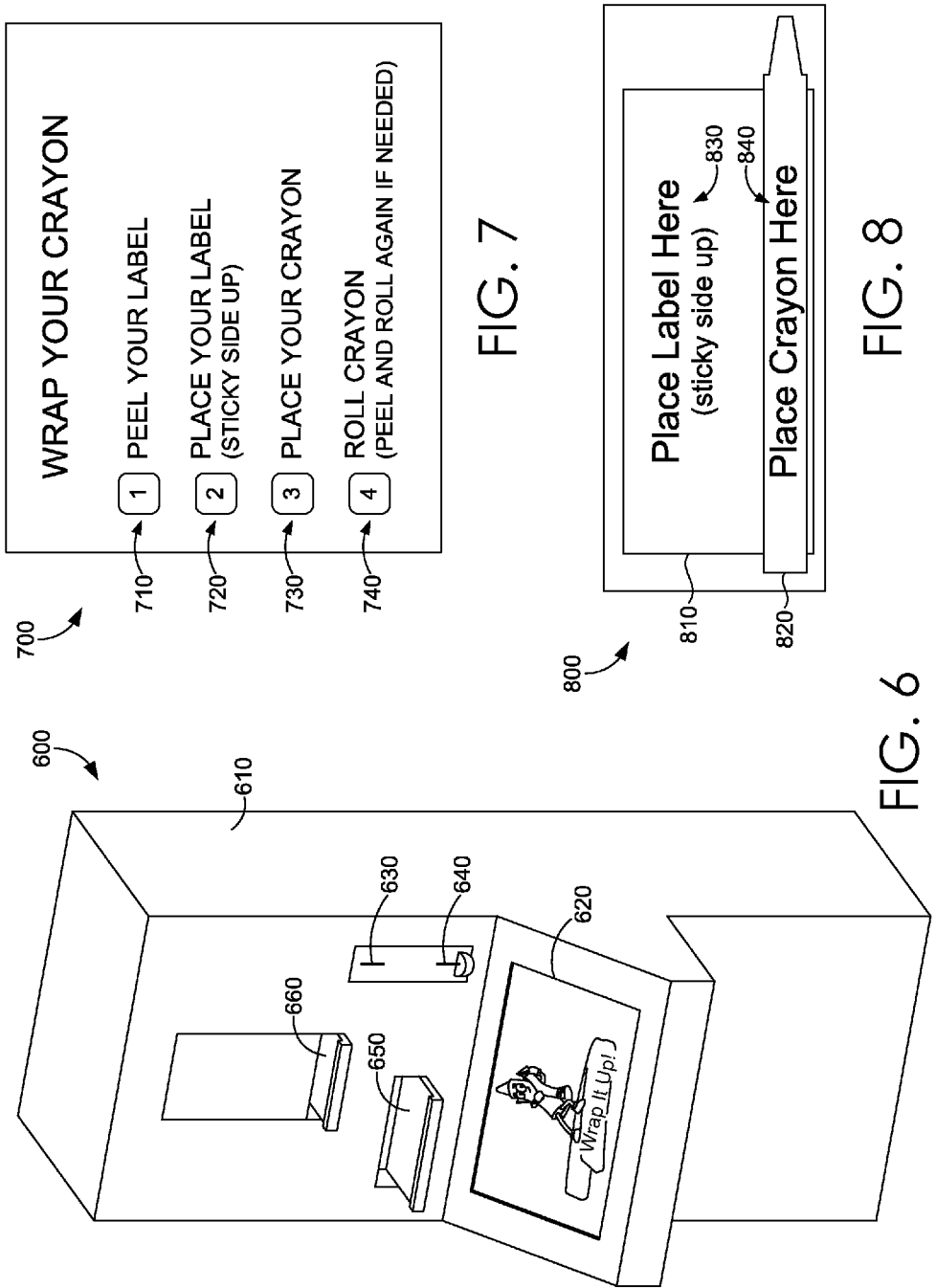

SYSTEM AND METHOD FOR GENERATING CUSTOMIZED CRAYON LABELS

CROSS REFERENCE TO RELATED APPLICATION

This application claims priority to U.S. Provisional Application No. 61/993,683, entitled "System and Method for Generating Customized Crayon Labels," filed May 15, 2014, the entire contents of which is hereby incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed description section below. This summary is not intended to identify key features or essential features of the claimed subject matter, nor is it intended to be used as an aid in isolation to determine the scope of the claimed subject matter.

In brief and at a high level, this disclosure describes, among other things, a system for creating and dispensing a customized crayon label. In embodiments, the system dispenses a customized crayon label and a crayon body in response to receipt of a token and/or corresponding indication of user input received via a user interface. As such, the received indications may include user content for including on the customized crayon label. In embodiments, a method for generating a customized crayon label utilizes a label template for populating with received user content, to generate a customized crayon label for printing. In yet another embodiment, upon receiving an indication to generate a customized crayon label, the method includes determining label content based on a selected template and an indication of user content. In further embodiments, computer-readable storage media provides instructions for performing a method of generating a customized crayon label.

DESCRIPTION OF THE DRAWINGS

Illustrative embodiments of the invention are described in detail below with reference to the attached drawing figures, and wherein:

FIG. 6 is a front, perspective view of a system for generating a customized crayon label, in accordance with an embodiment of the invention;

FIG. 7 is a front view of exemplary instructions for affixing a generated, customized crayon label to a crayon body, in accordance with an embodiment of the invention;

FIG. 8 is a front view of exemplary instructions for affixing a generated, customized crayon label to a crayon body, in accordance with an embodiment of the invention;

DETAILED DESCRIPTION

Figure 1:
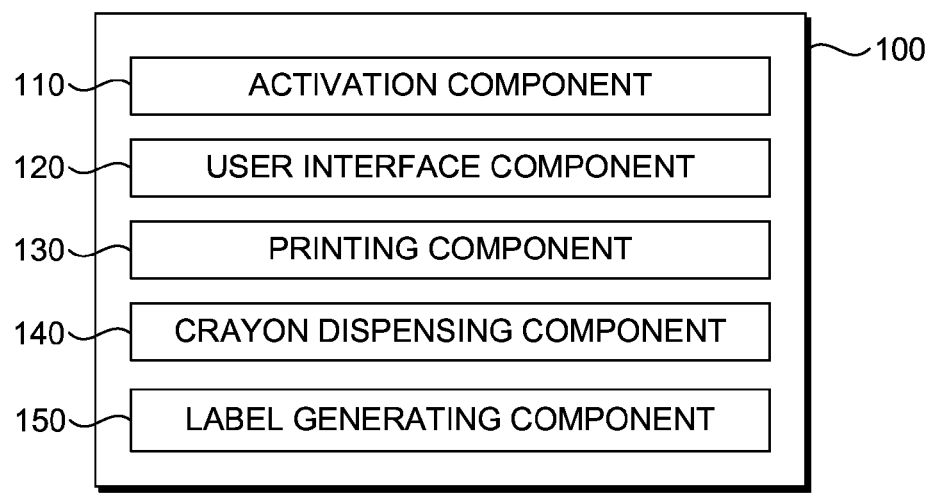
FIG. 1 is a block diagram of a system for creating and dispensing a customized crayon label, in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention are directed to a system for generating customized crayon labels. In embodiments, the system includes one or more of the following components: an activation component for receiving an indication of activation (e.g., receiving a token, swiping a card, or motion-sensor activation); a user input and/or interface component, such as a touch-screen user interface, for receiving indications and/or user content via the user interface and/or an input component associated with the user interface (e.g., a keyboard associated with the user interface); a determining component for determining customized crayon label content based on the received user content; a printing component for printing and/or dispensing a customized crayon label; and a dispensing component for dispensing a crayon corresponding to the determined/printed customized crayon label. In one embodiment, the system determines one or more items of customized crayon label content based on 1) a selected crayon label template, and 2) received and/or input user content for including on the selected crayon label template. In some embodiments, the customized crayon label system is configured to print the generated, customized crayon label having determined items of customized crayon label content, and dispense an associated crayon. In further embodiments, instructions for affixing the customized crayon label to the dispensed crayon may be provided to the user.

As such, embodiments of the invention include a method for generating a customized and/or personalized crayon label for affixing to a corresponding, dispensed crayon body. In embodiments, an indication to initiate customized crayon label generation is received, such as an indication received based on detection of a received token and/or an indication based on interaction with an input component (e.g., a user interface). In further embodiments, in response to the received indication to initiate customized crayon label generation, a crayon label template selection and an indication of user content are received. In one embodiment, a user may select a particular crayon label template for populating with a particular item of user content. For example, a user may input crayon label content, such as "Happy Birthday!" or "Vicky's crayon," for insertion, by the system, into a particular portion of the label template prior to printing. In embodiments, the determined customized crayon label corresponds to the selected crayon label template and/or the received indication of user content. As such, in one embodiment, the system may determine the content of a particular customized crayon label based on associating one or more items of input user content with one or more areas of template formatting configured to accept user content.

In further embodiments, the determined customized crayon label is provided for printing. For example, in one embodiment, the determined customized crayon label is printed on an adhesive label and a crayon configured to receive the printed, customized crayon label is dispensed. In some embodiments, instructions for affixing the printed, customized label to a crayon body may be provided to a user.

In one embodiment, a customized crayon label creation and dispensing system is provided. The system includes an activation component, a user input and/or interface component, a label generating component, a printing component, and a crayon dispensing component. In embodiments, in response to a token received by the activation component and one or more indications received by the user interface component, at least one customized crayon label is generated by the label generating component. In response to a token received by the activation component and one or more indications received by the user interface component, at least one crayon body and the at least one customized crayon label are dispensed by the system, in embodiments.

In another embodiment, a method for generating a customized crayon label is provided. The method includes receiving an indication to initiate customized crayon label generation, in embodiments. The method further includes receiving a label template selection, receiving an indication of user content, and determining a label content corresponding to 1) the received label template selection and 2) the received indication of user content. In embodiments, the method includes providing the determined label content for printing.

In yet another embodiment, one or more computer storage devices having computer-executable instructions embodied thereon that, when executed by a computing device having a processor and a memory, perform a method for generating a customized crayon label are provided. The method includes receiving an indication to generate a customized crayon label. The method includes, in embodiments, receiving an indication of user content. In embodiments, the indication of user content comprises one or more of receiving a label template selection from a plurality of label templates and receiving one or more terms from a user corresponding to at least one insertion portion of at least one label template. The method includes, in further embodiments, determining a label content based on the received indication of user content. At least one filter is applied to the determined label content to generate modified label content, in embodiments. Applying the at least one filter includes: upon identifying at least one prohibited term from a filter database of terms, removing the at least one prohibited term from the determined label content to provide the modified label content; and upon identifying that none of the terms in the determined label content are prohibited terms from the filter database of terms, generating the modified label content with the same terms as the determined label content. The method includes generating the customized crayon label, wherein the customized crayon label comprises the modified label content, in embodiments.

With reference now to the figures, a system and method for creating and dispensing a customized crayon label are described in accordance with embodiments of the invention. Various embodiments are described with respect to the figures, in which like elements are depicted with like numbers. Embodiments of the invention may be described in the general context of computer code or machine-useable instructions, including computer-useable or computer-executable instructions such as program modules.

Referring initially to FIG. 1, a block diagram of a system 100 for creating and dispensing a customized crayon label is provided. The system 100 is only one example of an embodiment of a suitable system, and is not intended to suggest any limitation as to the scope of use or functionality of the invention. Neither should the system 100 be interpreted as having any dependency or requirement relating to any one or combination of components illustrated in FIG. 1. Accordingly, although some components are shown in the singular, they might be plural. In embodiments, a single component might be configured to perform the functions of multiple components.

In one embodiment of the invention, the system 100 includes an activation component 110, a user interface component 120, a printing component 130, a crayon dispensing component 140, and a label generating component 150. In embodiments, the activation component 110 is configured to receive an indication to initiate customized crayon label generation, such as receiving a token or some other activation element from a user. In another example, a user may swipe and/or scan a pre-loaded debit card and/or device to activate the "purchase" of a customized crayon, and initiate the customized crayon label generation process.

In embodiments, the activation component 110 may detect and/or receive an indication to initiate the generation of a customized crayon label. Embodiments of the activation component 110 might include a token receiving component, a scanning component, a radio frequency identification component, a magnetic strip reading component, a speech recognition component, a voice activity detection component, a motion sensing component, a capacitive sensing component, a near field communication component, or a combination thereof. In one embodiment, the activation component 110 receives an indication to begin generating a customized crayon label based on receiving a token, via a token-receiving feature of the activation component 110. In some embodiments, the activation component 110 might receive an indication to begin creating a customized crayon label when a magnetic strip reading component reads a magnetic strip. In other embodiments, the activation component 110 might receive an indication to initiate the customized crayon label process when a voice-activity detection component detects the presence of a voice, or further, when a speech-recognition component recognizes speech and/or speech commands. In further embodiments, the activation component 110 might include a facial recognition component. The activation component 110 might include a plurality of components such that the creation of a customized crayon label may begin in response to a number of stimuli.

As such, embodiments of the invention referring to initiation of the customized crayon label process may be referred to as being initiated by "receipt of a token," whether or not an actual "token" is received. In some embodiments, the receipt of a token by the activation component 110 engages the system 100 and initiates customized crayon label generation and dispensing. Additionally and/or alternatively, when a token is received by the activation component 110, the system 100 may take one or more steps to prompt and/or initiate the receipt of user content and/or indications from the user interface component 120. In further embodiments, in response to a token received by the activation component 110, the system 100 might provide instructions for selecting a crayon label template and/or receiving input items of user content via the user interface component 120. In another embodiment, in response to a token received by the activation component 110, instructions for manually affixing a dispensed label to a dispensed crayon are provided in association with the system 100. In one embodiment, such instructions might be displayed via a user interface component 120.

In one embodiment of the invention, the user interface component 120 may include any input component configured to receive information and/or commands from a user, such as an interactive component having a graphical user interface (GUI) and/or a touch-screen display component for receiving user input. As such, the user interface component 120 may communicate and/or display text, images, video, animations, sounds, or a combination thereof to a user. The text and/or images, for example, might prompt a user to insert a token, press a button, or otherwise engage the system 100 through the user interface component 120 and/or various input components. Embodiments of various user input components might include a keyboard, a touchscreen, a track-pad, a mouse, a tracking ball, push buttons, a camera, a microphone, a motion sensing component, a gesture recognition component, a facial recognition component, a natural user interface, or any combination thereof, for example. Further, the user interface component 120 might communicate and/or display directives that prompt the user to initialize crayon label creation (e.g., "Start creating your unique Crayola crayon now," or "Make your own crayon label!"). In some embodiments, the user interface component 120 communicates and/or displays notifications of system functions and/or feedback to a user (e.g., "Creating your custom Crayola crayon now!" or "Great job!"). Additionally and/or alternatively, the user interface component 120 might communicate and/or display system progress notifications or other indicators (e.g., "Printing your unique Crayola crayon now!" or "Catch your Crayola crayon below."). Embodiments of the user interface component 120 might also communicate text and/or images that prompt a user to proceed with post-initialization system 100 functions (e.g., "Pick a label," "Continue?" or "Print") throughout customized crayon label generation.

The user interface component 120 may also elicit input of one or more items of user content, in some embodiments. Input user indications and/or user content may be received by the user interface component 120. In one aspect, an indication received by the user interface component 120 might include one or more particular items of user content. Embodiments of input user content might include one or more alphanumeric characters, punctuation marks, symbols, ideograms, spaces, emoji, or a combination thereof. Additionally or alternatively, user content might include selection and/or activation of one or more predetermined options from which a user may choose (e.g., a crayon color of red, green, or purple). In another aspect, an indication received by the user interface component 120 might include a user selection of a crayon label template. In one example, an indication received by the user interface component 120 might include a template selection and/or an input item of user content. In some embodiments, any number of crayon label templates might be presented to a user for selection by a user. Embodiments of customized crayon label templates might include one or more crayon label templates of different sizes, shapes, colors, and/or content. Such templates might include predetermined content such as the current date, a crayon color name, and/or additional label graphics (e.g., a template having a black border including a serpentine pattern). In embodiments, predetermined content might be pre-printed on a crayon label, prior to printing user content onto at least a portion of the pre-printed label to provide a customized crayon label.

In another embodiment, user content might be generated for and/or printed simultaneously onto the customized crayon label, along with other items of content generated according to one or more content requirements. For example, in one embodiment, a template may provide a first field for the user-generated content (e.g., a phrase the user wishes to print on the crayon, such as "Vicky's Purple Crayon"), a second field for a predetermined item of crayon information (e.g., identifying information, such as the particular crayon's color "purple mountains majesty"), and a third field for populating with the date on which the customized crayon was generated and/or printed (e.g., including month, date, and/or year of printing). In one embodiment, the user may assign and/or input particular content for population into a single field on a predetermined crayon template, such as a particular area of the customized crayon label for populating with a phrase or statement, such as the user's name. As such, in one embodiment, determined label content may include the assigned/input content from the user, along with the color name of the dispensed crayon body, and the date on which the user generated the customized crayon label and/or printed the customized crayon label.

Additionally and/or alternatively, an indication might be received by the user interface component 120 that includes an indication to begin creating a customized crayon label, to continue customizing, to select a label template, to input one or more items of user content, to preview a label template integrating input user content, to print a customized crayon label, and/or to terminate the customized crayon label creation. For example, a user might select a "Preview" option to generate, on the user interface component 120, a display of a selected label content incorporating user content. In another example, a user might select a "Continue" option to continue generating a customized crayon label. In another example, a user might select a "Print" option to begin printing of a customized crayon label.

In further aspects, indications and/or user content received by the user interface component 120 may be utilized by the system 100 to generate at least one customized crayon label to be dispensed by the system 100. In one embodiment, a customized crayon label includes a template selection. In another embodiment, a customized crayon label includes one or more items of user content. In embodiments, a customized crayon label includes both a label template selection and one or more items of user content. In some embodiments, a customized crayon label corresponds to indications of input user content received by the user interface component 120. In yet another embodiment, a customized crayon label further includes selected options such as font size and font type, for example. In this way, a customized crayon label may be generated that includes a selected template that incorporates input user content and/or indications received by the user interface component 120. Further still, the content of a customized crayon label might be determined based on the one or more indications and/or items of user content received by the user interface component 120. In further aspects, in response to a token received by the activation component 110 and one or more indications received by the user interface component 120, at least one crayon and at least one customized crayon label are dispensed by the system 100.

In embodiments of the invention, a label generating component 150 determines label content based on a label template selection and/or an indication of user content. In determining label content, the label generating component 150 might insert, integrate, and/or incorporate one or more items of user content and/or indications of user content into a user-selected and/or automatically selected label template. In further embodiments, one or more label templates include a fillable portion in which one or more items of user content may be placed. A fillable portion might control the placement, orientation, and/or alignment of one or more items of user content on a label template. In embodiments, the label generating component 150 may determine label content by placing one or more items of user content within a fillable portion of a selected template. In some embodiments, the one or more items of user content might be limited by any of the label size, font size, character number, shape, placement, orientation, and/or alignment of a fillable portion of a selected template. In such embodiments, for example, the label generating component 150 might indicate to a user that the one or more items of user content may not be completely and/or successfully incorporated into the selected label template (e.g., prevents a user from selecting a template based on the user content, generates a message to be displayed to a user on a user interface, and/or prevent a user from inputting characters past a character limit associated with a fillable portion and/or a selected template). In some embodiments, the label generating component 150 might determine label content by adjusting the placement, orientation, and/or alignment of a fillable portion of a selected template to accommodate one or more items of user content. The label generating component 150 might control, limit, adjust, an/or resize the size and/or font size of one or more items of user content based on any of the size, font size, character number, shape, placement, orientation, and/or alignment of fillable portion of a selected template, in further embodiments. The label generating component 150, upon determining label content, might provide the determined label content to the user interface component 120 for display to a user, and/or might provide printing instructions for the determined label content to the printing component 130.

In further aspects, a dispensed customized crayon label may be printed by the printing component 130. Embodiments of the printing component 130 are configured to receive printing instructions for printing a customized crayon label. In some embodiments, printing instructions might be based on indications received from the user interface component 120 and/or one or more items of user content. Additionally, the printing component 130 may print, when instructed, one or more customized crayon labels. In embodiments, the printing component 130 might print one or more crayon label templates populated with one or more items of input user content, to provide a customized crayon label. Further, printed customized crayon labels may be individually and/or serially dispensed by the system 100. The printing component 130 includes, in some embodiments, a label feeding component that facilitates feeding material and/or labels into and/or out of a printer, and ensures proper label position and alignment for printing and/or dispensing. In one embodiment of the invention, the printing component 130 includes a tensioning component configured to adjust an amount of tension applied to the continuously fed label material. As such, in some embodiments, a rate of printing and/or a number of printing requests may dynamically affect a configuration of the tensioning component, or alternatively, may be affected by the tensioning component.

In some embodiments, the printing component 130 includes a label dispensing component for dispensing one or more printed customized crayon labels and/or crayon label templates. In one embodiment, in response to printing and dispensing of a customized crayon label, instructions for manually affixing the dispensed label to the dispensed crayon are provided. Such instructions might be provided in association with the system 100, such as a set of instructions displayed to a user via a component of the system 100, and/or a set of instructions printed by the printing component 130. Any suitable type of printing method (e.g., dot matrix, ink jet, laser, dye-sublimation, pressure-sensitive, and/or thermal printing) may be employed by the printing component 130 to achieve its purpose. Also, embodiments of a label might be generated using any type of adhesive labeling material that is suitable to be printed on, and suitable for affixing to a crayon body, as dispensed by the system 100.

In embodiments of the invention, the crayon dispensing component 140 facilitates dispensing a crayon body (e.g., a "plain" crayon without a label or wrapper affixed to an external surface). Exemplary types of crayon bodies may be formed with a particular composition of wax and/or paraffin, for example. Crayon bodies, in various embodiments, may be cylindrical, pyramidal having three or more sides, conical, a polyhedron, and/or egg-shaped, for example. Crayon bodies may include a writing tip to facilitate controlled and/or precise marking of surfaces with a crayon body, in embodiments. In further embodiments, the composition of wax, paraffin, and/or other additives, in combination with the shape and/or size of the crayon body, might strengthen the crayon body structure to prevent breakage and/or might be suited to a particular marking surface (e.g., dry erase board, glass, porcelain, fiberglass, construction paper, coloring book paper, and/or other writing surface). Further exemplary crayon body types might include a glitter crayon, a metallic crayon, a neon crayon, a washable crayon, a fluorescent crayon, a phosphorescent crayon, a dry-erase crayon, a bath-tub marking crayon, and a fabric crayon.

An embodiment of the crayon dispensing component 140 is configured to dispense at least one crayon body while reducing the likelihood of breakage during vending. In one embodiment, the crayon dispensing component 140 includes a hopper and/or a push-block mechanism for vending and/or delivering one or more crayon bodies to a user, for example. In some embodiments, the crayon dispensing component 140 might also include an agitation component and/or a dispensing mechanism. In one example, an agitation component might include one or more rollers that shift and/or rotate to manipulate, align, and/or receive a crayon body. In a further example, a roller of an agitation component might include one or more notches for receiving a crayon body and/or for releasing a received crayon body to a dispensing mechanism upon rotation of the roller. In one example, a dispensing mechanism might include a chute, tube, conveyer, and/or other means for carrying and/or conveying a crayon body to a user. In some embodiments, various appendages, such as protruding trays, lips, and/or edges, or alternatively, various recessed compartments and/or pockets may be utilized by the crayon dispensing component 140 to catch the dispensed crayon body so that a user may retrieve it. In one embodiment, in response to a token received by the activation component 110 and one or more indications received by the user interface component 120, at least one crayon body and at least one customized crayon label are dispensed by the system 100. In embodiments, after dispensing at least one customized crayon label and dispensing at least one crayon body using one or more features of the crayon dispensing component 140, a user may affix the dispensed customized crayon label to the dispensed crayon body (e.g., by wrapping the "plain" crayon body with the dispensed customized crayon label having an adhesive backing).

In embodiments, a customized crayon label is created by printing one or more items of user input onto a crayon label having an adhesive backing (e.g., an adhesive label). An adhesive label, in embodiments, includes a first surface to which an adhesive is affixed, wherein the first surface may be placed in contact with an item or other surface to facilitate adhering of the first surface to the item or the other surface. The type and strength of adhesive used may be application specific. The adhesive label includes a second surface, opposite the first surface, wherein the second surface may be suitable for marking (e.g., printing, writing, pressure-sensitive surfaces, or scratch-able coatings), in embodiments. In various embodiments of the invention, the printing component 130 may print one or more items of user input on the second surface of the label such that, when the customized crayon label is generated, the first surface may be affixed to a crayon body, causing the second surface to be exposed and visible, displaying the one or more items of printed user content. An adhesive label may be any material, shape, and size suited for embodiments of the invention. In some embodiments, an adhesive label might be opaque or transparent. In one embodiment, the adhesive label is constructed of opaque paper, wherein the paper grade promotes clear printing and friction when a crayon body affixed with a crayon label is held and/or utilized by a user.

Figure 2:
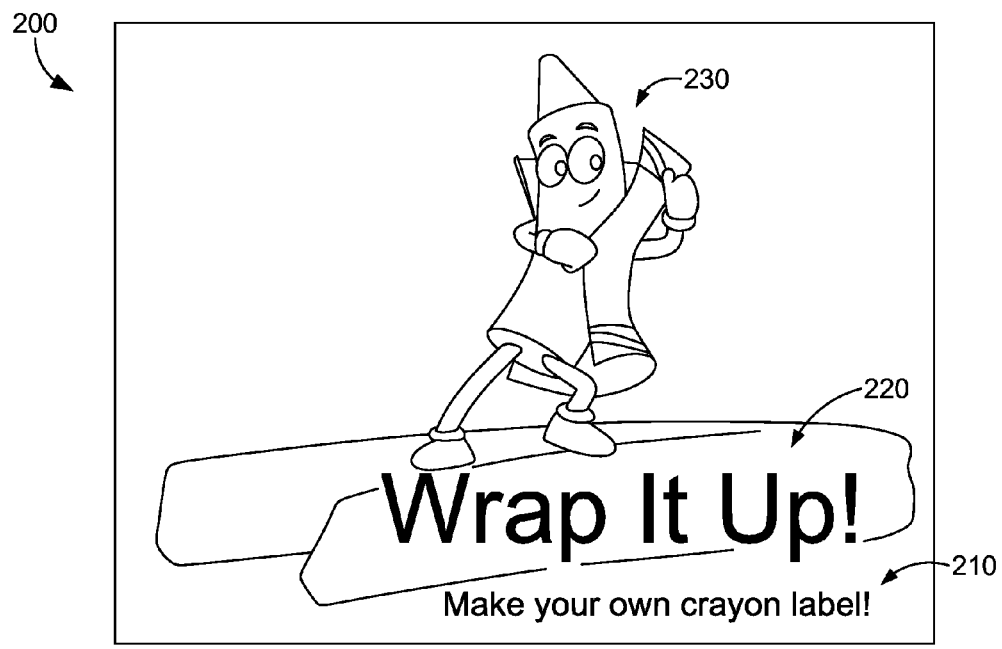
FIG. 2 is an exemplary user interface for generating a customized crayon label, in accordance with an embodiment of the invention.

Turning now to FIG. 2, an exemplary user interface 200 is depicted in accordance with an embodiment of the invention. In the example of FIG. 2, the user interface 200 is a GUI for prompting a user to interact with the user interface 200 and/or insert a token to generate a customized crayon label. In embodiments, the user interface 200 includes a message, tagline, and/or headline 220 (e.g., "Wrap It Up!"), which may be displayed to elicit an initial and/or sequential user interaction. In further embodiments, any number of directives and/or prompts 210 might also be communicated and/or displayed in association with the user interface 200 (e.g. "Make your own crayon label!" or "Insert a token to begin," may be visually presented and/or audibly announced to a user). As such, embodiments of the user interface 200 may include one or more features, such as text, images, video, sound, and/or animations, which indicate how a token may be inserted into a token receiving slot, where the token receiving slot is located, and/or that token insertion initiates customized crayon label generation. In one example, the user interface 200 might display a character 230, wherein the character 230 visually communicates one or more outcomes of the system, i.e., creating a customized crayon label that can be wrapped around a crayon body. Alternatively, the user interface 200 may remain in a static state, such as a "sleep" mode, when not engaged in crayon label customization. For example, embodiments of the user interface 200 display might include a dark and/or stationary image displayed thereon, which remains inactive until a token is inserted, or user presence and/or user interaction is detected.

Figure 3:
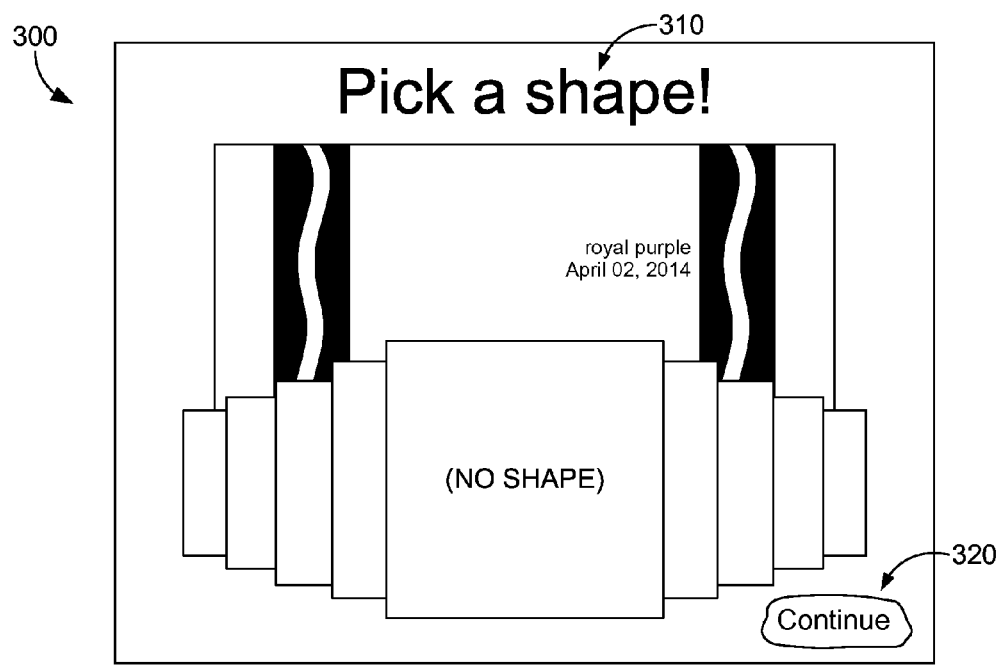
FIG. 3 is an exemplary user interface for generating a customized crayon label, in accordance with an embodiment of the invention.

As shown in the embodiment of FIG. 3, an illustrative user interface 300 is depicted in accordance with an embodiment of the present invention. In embodiments, the user interface 300 is configured to receive user content and/or indications, and present a potential selection option from which a user may choose. In the example of FIG. 3, the user interface 300 displays one or more directives and/or prompts 310 and 320 to a user to select a particular label template and interact with the user interface 300 (e.g., "Pick a shape!" or "Continue?"). In embodiments, any number of label templates may be presented to a user for selection. Such label templates might vary in size, shape, color, and/or other attributes, such as fillable portions.

In embodiments, label templates might include shared characteristics, such as, for example, a serpentine border that is commonly applied to at least one portion of a label template. Said label templates might include predetermined content, such as, for example, a crayon color name, a crayon logo, an indicator of crayon manufacturer, a company logo, a current date, and/or a location where the customized crayon label is being generated.

In some embodiments, a portion of a crayon label template is pre-printed onto adhesive labels, which may be populated with one or more items of content as indicated and/or requested by a user. For example, a crayon label template may include a pre-formatted and/or predetermined location, orientation, and/or alignment for insertion of one or more items of input user content, e.g., a crayon name. Upon printing the customized crayon label, the pre-formatted, predetermined location may be populated with the crayon name provided by the user, and the printing component may be configured to align a printing mechanism that prints the crayon name in the predetermined location and in the specified format. In another embodiment, template information and/or design information may be stored by the system and not pre-printed onto a label. Accordingly, upon a printing request for a customized crayon label, the printing mechanism may print both the predetermined template content and the corresponding user input content onto the label. As such, the system may determine where to orient the user input content, such as populating one or more pre-formatted locations on the label template with the user content, and prepare to print the entire label content onto the blank label. As such, in one embodiment, the label content printed onto the blank label may include "determined" content having both predetermined template content and formatted and/or oriented user input content.

In some embodiments, the user interface 300 prompts a user to enter one or more items of user content and/or make a selection of one or more further options. For example, the user interface 300 might prompt a user to select a crayon label template, which might further include selecting the color of the crayon label. The user interface 300 might then prompt the user to select a crayon color (e.g., crayon body color) to which the customized crayon label might correspond. In some aspects, a user might be prompted to select a crayon label template from a plurality of crayon label templates, which might further correspond to one or more of a crayon body shape and/or a themed template (e.g., a birthday themed template including a serpentine border of balloons and/or candles).

In some embodiments, the user interface might prompt a user to input information (e.g., the age of the user or other recipient of the customized crayon), and a label generating component might provide a plurality of crayon label templates for selection, based on the information received. For example, a user might be prompted to enter the age and/or select the age range of a recipient of the customized crayon, wherein upon entering the age of seven years, or selecting an age range including seven years, a plurality of crayon label templates might be provided by the label generating component based on the age and/or age range. Exemplary crayon label templates might include one or more graphic and/or border items depicting particular themed content, such as airplanes, kittens, planets, rainbows, dinosaurs, and/or other objects based on the age of the recipient. In further embodiments, graphic borders might appear alongside, or in place of, a serpentine border. In another example, upon entering the age of three years or selecting an age range including three years, a plurality of crayon label templates might be provided by a label generating component for selection, wherein the crayon label templates correspond to a crayon having at least three sides for gripping based on the age provided (e.g., a three-sided crayon for a young child). As such, in some embodiments where a three-sided template is selected and/or generated, and a printed label oriented to include such template content is generated/printed, the system may also dispense the corresponding three-sided crayon body for applying the printed label.

In further aspects, the user interface 300 prompts a user to input one or more items of user content, such as a user's name, a recipient's name, a birthdate, a crayon color, and/or a message, for example. In further embodiments of the invention, a user is prompted to select a font size and/or font type to be applied to user content to be placed, for example, within a fillable portion of a selected label template. In some aspects, the user content and/or selected options may be integrated with the selected template to generate a customized crayon label.

Figure 4:
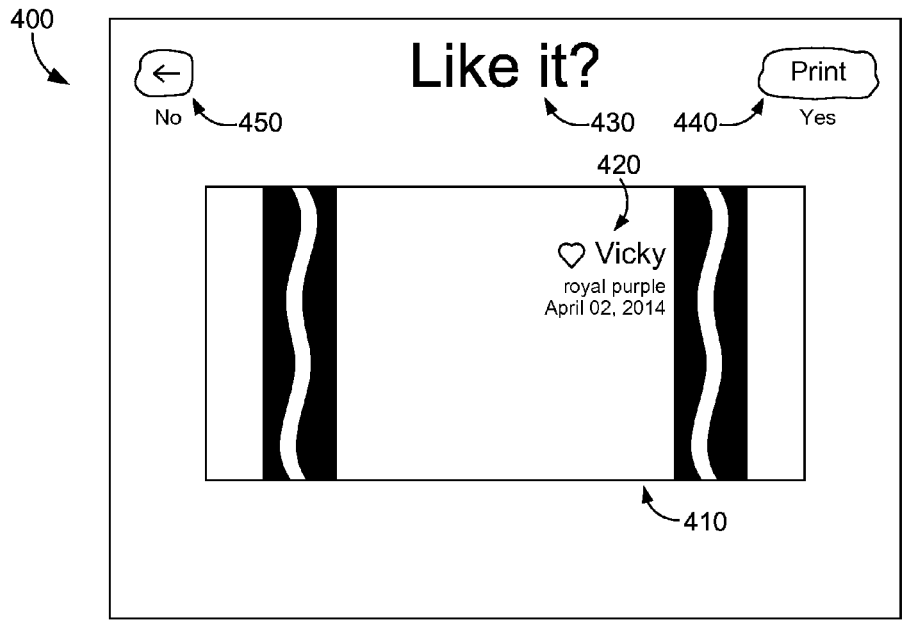
FIG. 4 is an exemplary user interface for generating a customized crayon label, in accordance with an embodiment of the invention.

Turning now to FIG. 4, an exemplary user interface 400 depicts a received indication of a selected template 410 and user content 420, shown here as a heart-shaped icon and the input user content "Vicky." In further aspects, the user content 420 might include any personalized message and/or content (e.g., "Happy $8^{th}$ Birthday!"). In embodiments, user interface 400 might display the user content 420 as it is being entered in near real-time and/or after it has been entered. Various input components for user content 420 have been previously described. In aspects, the user interface 400 might also display the user content as integrated into a selected crayon label template, to present a user with a preview of the customized crayon label to be generated. In one example, predetermined content, for example, a color name, a date, and/or a fillable portion, might also be displayed in the selected template 410 alongside the user content 420. In some embodiments, a preview of the customized crayon label is shown on the user interface 400 to indicate, by dashed lines, shading, and/or other indications, a fillable portion of the template where user content may manually and/or automatically be placed, for example, by a label generating component. One or more fillable portions of the template might be displayed as integrating the user content, when a preview of a customized crayon label is displayed. In some embodiments, a fillable portion is not shown or indicated on the user interface 400 in a preview of a customized crayon label. The fillable portion of a template may automatically facilitate the placement, alignment, and/or orientation of user content relative to other elements of the template, such as a serpentine border.

In further aspects, the user might be presented with one or more directives, such as the "Like it?" directive 430 to elicit feedback from a user. For example, if a user likes the preview of the customized crayon label to be printed, the user might interact with the user interface 400 to indicate that the previewed, customized crayon label should be printed. A user might select a "Print" or "Yes" option 440 displayed on the user interface 400, for example. In one embodiment, if the user does not like the preview of the customized crayon label to be printed, the user might interact with the user interface 400 to indicate that the previewed label should not be printed. For example, a user might select a "No" option 450 displayed on the user interface 400. In this way, the user interface 400 may receive indications of whether or not a user wishes to continue with generating and/or printing the customized crayon label. Further, the user interface 400 might allow the user to navigate to a previous display and select another template and/or enter new user content.

Figure 5:
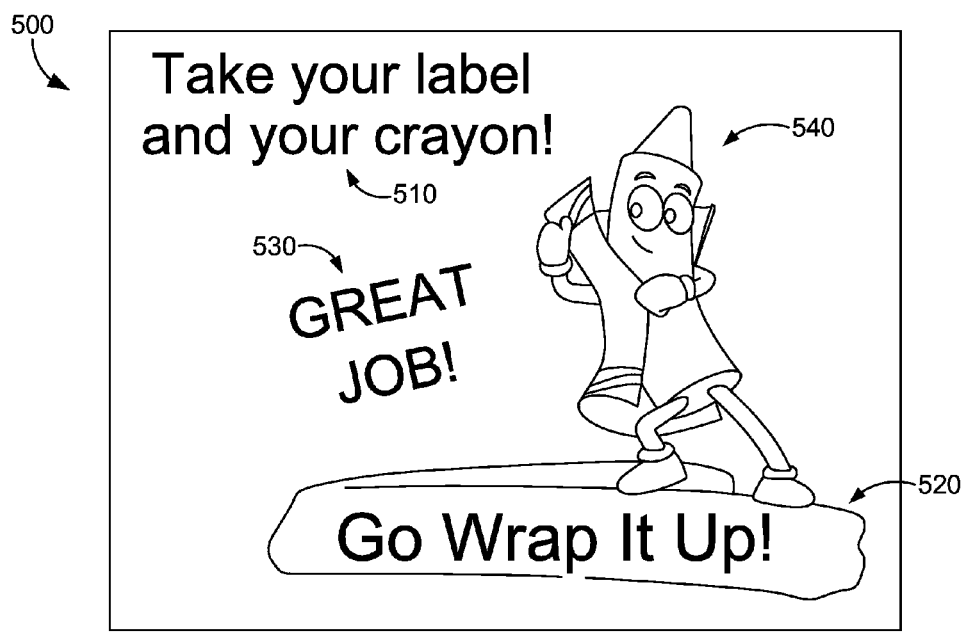
FIG. 5 is an exemplary user interface for generating a customized crayon label, in accordance with an embodiment of the invention.

With reference next to FIG. 5, an illustrative user interface 500 may display one or more notifications of a system function and/or progress indicators. For example, the user interface 500 might display the message "Printing your unique Crayola crayon now!" in response to a token received by an activation component 110 (e.g., a token receiving component) and/or one or more indications received by the user interface 500. In one aspect, a printing component might be provided with printing instructions from a label generating component, and further, the printing component may print a customized crayon label using the provided printing instructions. Alternatively or additionally, the user interface 500 might display a message 510, such as, "Take your label and your crayon!" in response to, for example, a crayon dispensing component dispensing a crayon body to a user. In some aspects, the user interface 500 might display a directive 520 (e.g., "Go Wrap It Up!"), an indicator of feedback 530 to a user (e.g., "Great job!"), and/or a character 540. In embodiments, the directive 520, feedback 530, and/or character 540 might be displayed upon completion of generating a customized crayon label, printing the generated customized crayon label, dispensing the generated and previewed customized crayon label, and/or dispensing a crayon body. In embodiments, the user interface 500 might also display instructions for affixing the dispensed customized crayon label to the dispensed crayon (e.g., instructions for wrapping the dispensed crayon body with the dispensed customized crayon label having adhesive backing).

Turning next to FIG. 6, a front perspective view of a crayon label generating and dispensing system 600 is provided. In some embodiments, the system 600 includes one or more components similar to those in the system 100 described with reference to FIG. 1. In embodiments, the system 600 includes a housing 610, a user interface 620, a token receiving slot 630, a token return slot 640, a printed label compartment 650, and a crayon receptacle 660. The user interface 620 may be similar to the user interfaces described in FIGS. 2-5. In some embodiments, the token receiving slot 630 and token return slot 640 may be coupled to an activation component and/or another component configured to receive an indication of activation of the system 600, such as a card-swiping mechanism. In some embodiments, directives, instructions, options, feedback, and/or a preview of determined label content might be displayed on the user interface 620. In further embodiments, the printed label compartment 650 may receive or capture at least one dispensed customized crayon label and, further, be coupled to a printing component. The crayon receptacle 660 may be configured to receive and/or capture at least one dispensed crayon body, and further be coupled to a crayon dispensing component. Alternatively, a single receptacle may be used to receive and/or capture both a dispensed customized crayon label and a dispensed crayon body.

In one embodiment, a crayon dispensing component is configured to dispense a particular size and/or style of crayon body. In further embodiments, a crayon dispensing component may be configured to dispense one of multiple different sizes and/or styles of crayon bodies in response to a particular selection by a user. In another embodiment, based on a particular customized crayon label generated by a user, the corresponding crayon body for the determined customized crayon label may be dispensed, such as a first crayon body size dispensed in association with a first crayon body label generation, and a second crayon body size dispensed in association with a second crayon body label generation, etc.

Referring now to FIG. 7, illustrative instructions 700 are depicted, in accordance with an embodiment of the invention. As described above, in embodiments, instructions 700 for manually affixing and/or attaching a dispensed customized crayon label to a dispensed crayon body may be provided in response to one or more interactions with the system 600, such as in response to a token received by an activation component 110 (e.g., a token receiving component). For example, instructions 700 might include one or more sequential directives, for example, a first step 710 (e.g., "Peel Your Label"), a second step 720 (e.g., "Place Your Label"), a third step 730 (e.g., "Place Your Crayon"), and a fourth step 740 (e.g., "Roll Crayon"). Said directives having first, second, third, and fourth steps 710, 720, 730, and 740 might be accompanied by additional text, images, video, and/or animations for illustrating performance of the directives and/or a sequence for performing any number of steps 710, 720, 730, and 740. Said directives (steps 710, 720, 730, and 740) might be displayed on a GUI, printed out and dispensed to a user, and/or displayed in a stationary installment associated with a system 600.

FIG. 8 depicts an item of detail of the system of FIG. 6, in accordance with an embodiment of the present invention. In some embodiments, the system 600 is associated with a crayon wrapping area 800. The crayon wrapping area 800 may further include an area designated for customized label placement 810 and an area designated for crayon placement 820. In one aspect, the area designated for label placement 810 might include a directive 830, for example "Place Label Here (sticky side up)," wherein a label has an adhesive surface. In further aspects, the area designated for label placement 810 may be approximately the length and width of a customized crayon label. In yet further embodiments, the area designated for label placement 810 might indicate one or more width and length variations, with the one or more width and length variations corresponding to one or more of the crayon label templates provided to a user for selection. In another aspect, the area designated for crayon placement 820 may include a directive 840, for example, "Place Crayon Here." In embodiments, the area designated for crayon placement 820 may be shaped to accommodate a crayon body, such that it may be approximately the length and width of a received crayon body. Further, the area 820 might indicate where a writing tip of a crayon body may be located when a crayon body is placed in the area 820. In this way, a user may place a crayon body in the area designated for crayon body placement 820 such that the crayon body is properly oriented for wrapping the crayon body with a customized crayon label. In some embodiments, at least a portion of the area designated for customized crayon label placement 810 and/or at least a portion of the area designated for crayon body placement 820 are recessed into a surface. Recessing the areas 810 and 820 might aid a user in customized label and crayon body placement, and facilitate wrapping a crayon body with said label as the recessed nature of the surface "holds" the crayon body and customized crayon label. In further embodiments, recessing the areas 810 and 820 might facilitate proper manipulation of the crayon body over the customized label by guiding the crayon body as it is manipulated (e.g., rolled and/or turned) by a user to affix a customized label. In one example, a user may place a dispensed customized crayon label, adhesive side up, into the area designated for crayon label placement 810, and place a dispensed crayon body into the area designated for crayon body placement 820. In that example, the user may manipulate and/or roll the crayon body so that it contacts the adhesive side of the customized crayon label, thereby affixing the customized crayon label to the crayon body.

Figure 9:
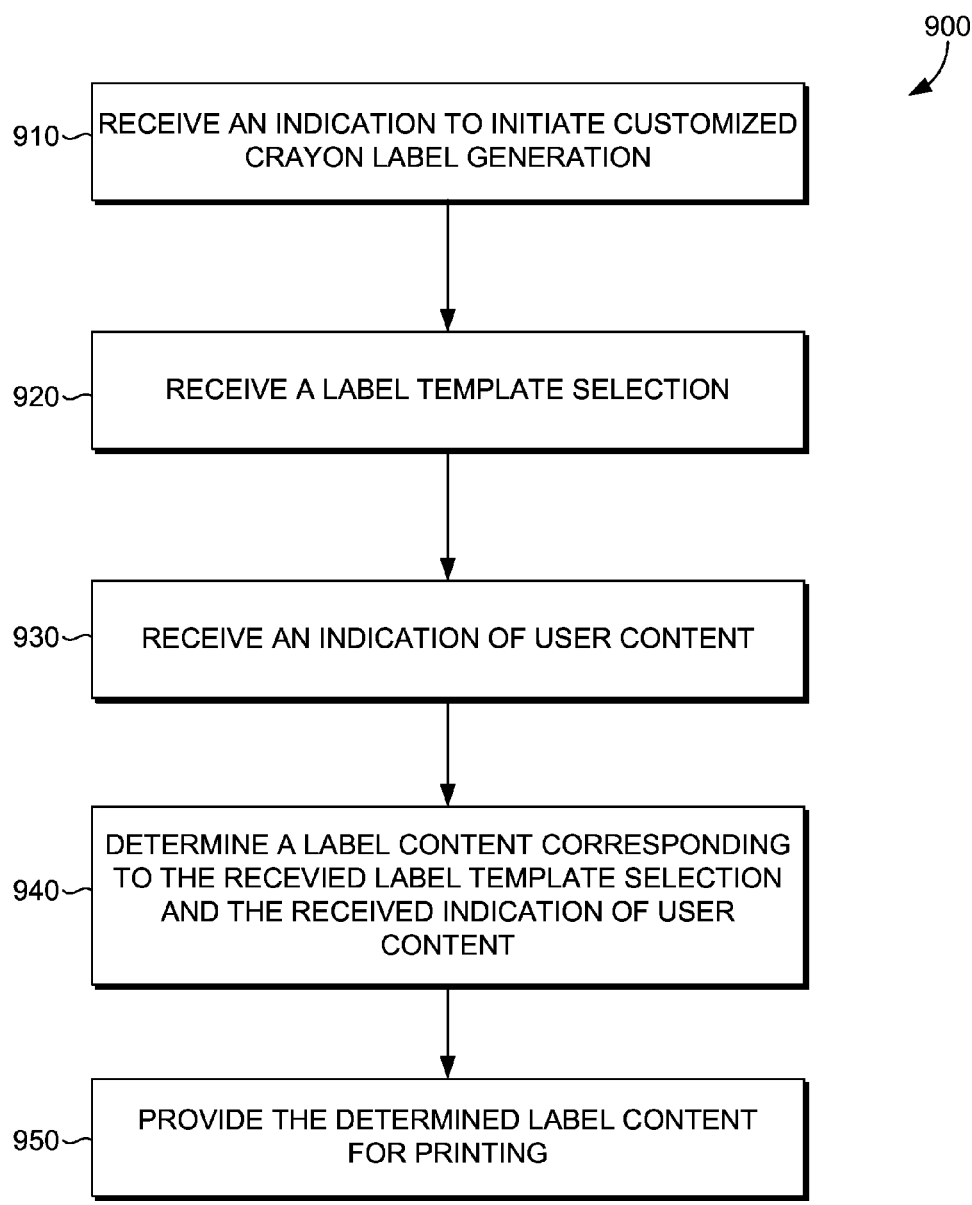
FIG. 9 is an illustrative flow chart of a method for generating a customized crayon label, in accordance with an embodiment of the invention.

Referring next to FIG. 9, an exemplary method 900 for generating a customized crayon label is shown. In one aspect, the method 900 may be implemented by one or more components of the system 100 discussed previously regarding FIG. 1. Although the terms "step" and/or "block" may be used herein to connote different elements of methods employed, the terms should not be interpreted as implying any particular order among or between various steps herein disclosed unless and except when the order of individual steps is explicitly described. Further, the method 900 might be embodied as computer-executable storage instructions that are stored on computer-readable media and are executed by a computing device having a processor and a memory.

Beginning at block 910, embodiments the method 900 include receiving an indication, from a user, to initiate customized crayon label generation. In embodiments, receiving an indication to initiate a customized crayon label generation might include receiving a token by an activation component, a user selection of a label template via a user interface component, and/or engagement with one or more features of an activation component (e.g., swiping a card, detection of voice command, and/or engaging a button) and/or a user interface component. In further aspects, the method 900 includes prompting a user to initiate crayon label generation. For example, a user may be prompted with directives and/or instructions to engage with an activation component (e.g., insert a token into token slot) and/or to interact with a user interface component (e.g., select at least one label template from a plurality of available label templates).

A label template selection is received at block 920. In embodiments, a label template includes a crayon label that may be customized. A plurality of label templates may be provided to a user for selection. In embodiments, a label template might include a predetermined label shape, label size, label graphics, label text, label color, label graphics, and/or fillable portions of a label template for the placement and/or orientation of user content. In embodiments, additional label templates might include options for various font colors and/or font sizes corresponding to input user content. In some embodiments, various themed label templates may be provided to a user for selection (e.g., a birthday themed label template including a balloon graphic border, or a dinosaur themed template including a dinosaur graphic and dinosaur bone border). Various embodiments of label templates may be presented to a user by a user interface component, such as a GUI, for example. In some embodiments, the user might select a label template for customization and/or personalization, and an indication of one or more user selections may be received by the user interface component.

In other embodiments, a user might select a label template based on a particular type of crayon body to be dispensed. For example, a user might select a label template corresponding to a crayon body having at least three sides for holding and/or gripping the crayon body with a hand (e.g., a triangular crayon having a three-sided body). In another example, a user might select a label template corresponding to a "chubby" cylindrical crayon body that is larger and therefore easier for a young user to hold and use. Alternatively, an adult user may, in some embodiments, select a narrower, cylindrical crayon body (i.e., a traditional crayon body) for personal customization.

In some embodiments, a label template may be automatically selected from a plurality of templates based on user input. In one embodiment, a user inputs an age and/or age range of a crayon recipient, and a label template corresponding to a crayon body corresponding to the input age and/or age range of the recipient is provided and/or automatically selected. For example, for a recipient less than five years old but greater than three years old, a label template corresponding to a crayon body having three sides for gripping might be provided. In another example, for a recipient less than three years old, a label template corresponding to an egg-shaped crayon body might be provided. In another embodiment, a user indicates that an intended crayon recipient is having a birthday, and a birthday themed template is automatically selected from a plurality of label templates.

At block 930, an indication of user content is received. In embodiments, an indication of user content includes at least one item of input user content, such as, for example, one or more alphanumeric characters, punctuation marks, symbols, ideograms, spaces, and/or emoji provided directly or indirectly by a user. For example, a user might input the user content "Happy 8th Birthday!" or "Vicky." In embodiments, the user content might then be used to customize the selected label template. In further embodiments, a particular label template might be suggested to a user for selection and/or automatically selected for a user based on the user content. For example, a user input the user content "Happy Birthday!" and a label generating component might suggest selection of a birthday themed label template, in one exemplary embodiment.

Turning to block 940, the method 900 determines a label content. In embodiments, determined label content may correspond to the received label template selection and the received indication of user content. In some embodiments, determining the label content corresponding to the received label template selection and the received indication of user content further includes integrating and/or incorporating one or more items of received user content within at least a portion of the received label template selection (e.g., a fillable portion of a received template selection). In further embodiments, determining the label content might correspond to combining and/or merging the input user content from the indication of received user content with a feature of a predetermined label template. In another embodiment, determining the label content might include implementing received indications of one or more selections (e.g., font color and font size) using a predetermined label template and the received user content. In one embodiment, determining the label content further corresponds to a received selection of a label shape, size, and/or font.

In embodiments, the determined label content corresponds to one or more items of received user content, for example, text input for a fillable portion of a template selection. In some embodiments, the method 900 might further include filtering predetermined words or terms from the determined label content in order to exclude one or more predetermined words or terms from the customized crayon label. For example, the method might include identifying specific words or terms that are not allowed to be used in creating and printing a customized crayon label. Such predetermined words and terms that are not allowed may include those words and terms that may be considered profane, obscene, and/or offensive. Additionally, predetermined excluded words for filtering from determined label content may include trademarked terms or registered trademark terms that the method excludes from printing on the customized crayon label.

Upon identifying the predetermined words or terms for filtering, the method 900 might proceed to remove said words or terms from the determined label content. In further embodiments, removal may be automatic. In this way, the method may prevent the creation and/or printing of customized crayon labels that are profane, obscene, and/or offensive, which might detract from the user experience. In further aspects, determined label content may be screened and/or filtered for identification and/or exclusion of particular terms. The screening and/or filtering may correspond to words or terms that are identified from a database of trademarked words/terms or prohibited words/terms from a listing and/or database of predetermined content.

In some embodiments, the method 900 might include editing the determined label content such that words or terms that are not allowed are removed from the determined label content. Editing and/or removal might be performed automatically and/or in real time when one or more items of content are received. After editing and removal, the determined label content may be presented to a user for review before proceeding with further aspects of customization. In one aspect, upon automatic removal of one or more words/terms from determined label content, the modified determined content may be presented to a user for acknowledgement of the modification (e.g., the automatic removal of a profane term). In another aspect, upon real-time removal of one or more words/terms from determined label content (e.g., a user is prompted to remove a term based on a filter identifying the term as being present in a list of prohibited terms), the user may again input an indication of approval and/or acknowledgement of the modified determined content that includes the change made in real time (i.e., the real time deletion of the prohibited term).

In another embodiment, the method 900 might include censoring the determined label content by recognizing particular, predetermined words or terms. Upon recognizing the predetermined words or terms received via a user interface, the method 900 might include determining not to accept the predetermined words or terms. For example, the questionable words might not be displayed to a user, an error notification might be presented, the predetermined words might not be accepted by the system such that a user cannot proceed to the next steps of customization, and/or a user might be prompted to begin entering new items of user content. Accordingly, an item of user content may be screened for profanity and/or obscenity prior to continuing with customization, and/or at any point during the customization process, in order to prevent the creation of customized crayon labels of prohibited content (e.g., content of questionable taste). In further aspects, determined user content may be modified at one or more steps along the customization process, and progression through the customization process may be interrupted at any point based on a determination of disallowed content. For example, in one embodiment, while a user's disallowed content may be displayed as incorporated into a label, the final printing feature of the system may be disengaged and the prohibited content may be interrupted. In another aspect, label content may be modified without user interaction and/or acknowledgement, and the process may continue to generate the modified, determined label content that includes the modification to the user-entered label content (i.e., the modified content to which the censor/filter was applied).

Once the label content is determined, the determined label content is provided for printing, as shown at block 950. In further embodiments, a printing component receives the determined label content and/or corresponding printing instructions. In response to the received, determined label content and/or printing instructions, a printing component might print the determined label. Additionally and/or alternatively, the method 900 might dispense at least one customized crayon label and/or at least one crayon body. In yet further embodiments, the method 900 might provide instructions similar to those described in FIG. 7, for affixing at least one dispensed customized crayon label to the at least one dispensed crayon body.

Figure 10:
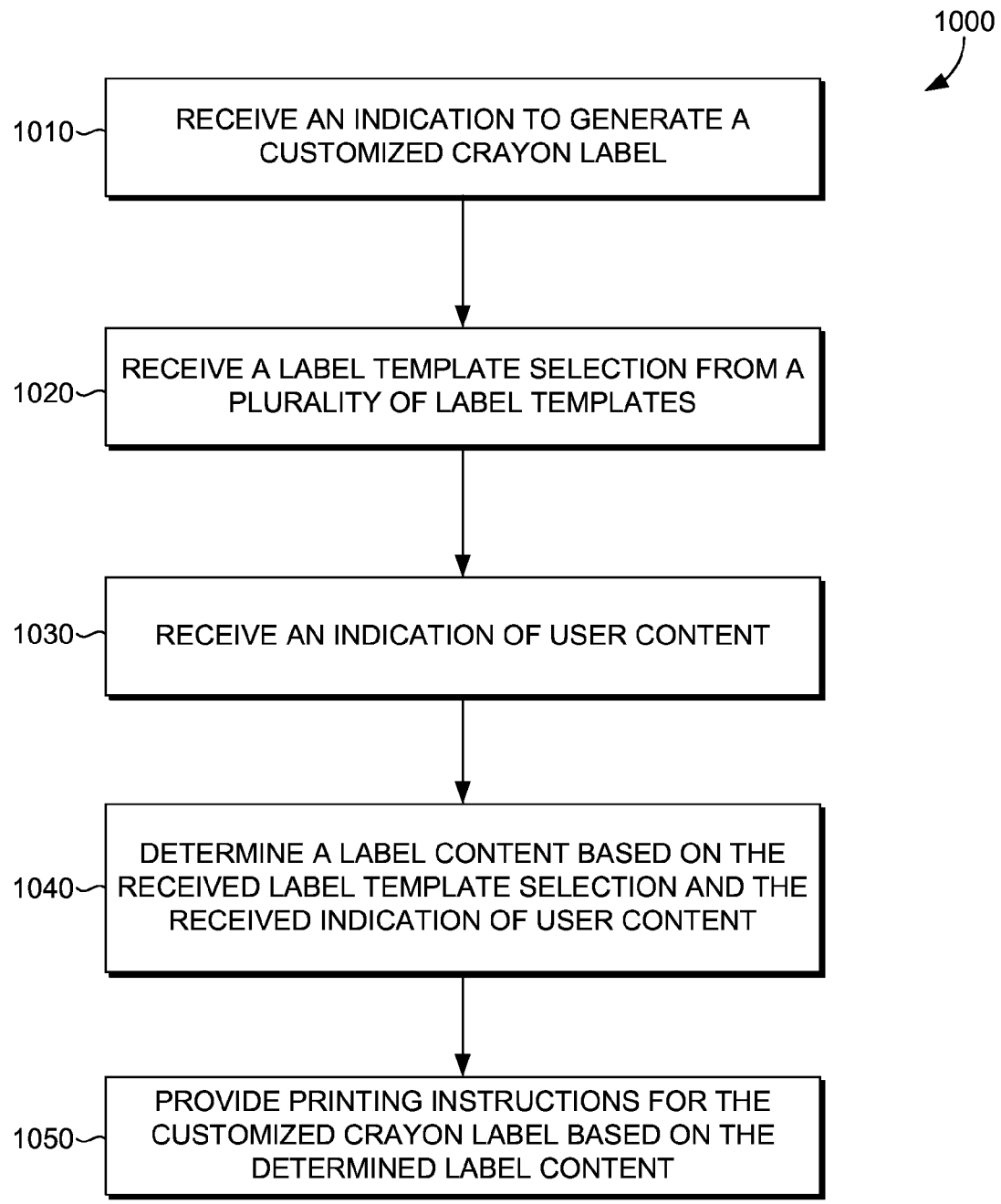
FIG. 10 is an illustrative flow chart of a method for generating a customized crayon label, in accordance with an embodiment of the invention.

Referring now to FIG. 10, a flow chart directed to method 1000 for generating a customized crayon label is provided. Initially, at block 1010, the method 1000 includes receiving an indication to generate a customized crayon label. In embodiments, an activation component might receive an indication to generate a customized crayon label. In one embodiment, an indication to generate a customized crayon label might be receipt of a token, detection of a voice command, detection of motion, and/or reading of a swiped card having a magnetic strip, for example. At block 1020, a label template selection is received. In various embodiments, selection of a label template is facilitated via a user interface and/or other input components. In one embodiment, a user selects a label template via a user interface by touching a touchscreen. In another embodiment, a user indicates and/or inputs the age of a recipient for a customized crayon label, and a label template might be selected based on the age of the recipient and/or a type of crayon body that is appropriate and/or suitable for the age of the recipient.

An indication of user content is received, as shown at block 1030. An indication of user content might include a selection of a label template, input user content, input information regarding a recipient, and/or selection of a theme, for example, in some embodiments. At block 1040, the method 1000 includes determining a label content based on the received label template selection and the received indication of user content. In embodiments, a label generating component might determine a label content. In some embodiments, a label generating component, for example, might integrate received user content (e.g., "Happy Birthday!") into the received label template selection (e.g., a selection of a birthday themed border including balloon graphics). In further embodiments, a label generating component might communicate the determined label content to a user interface for display to a user (e.g., a preview of a customized crayon label). In yet further embodiments, a user interface might display options and/or directives to a user to approve the determined label content as previewed prior to printing. An indication of user content might be received, including an indication of approval or disapproval with the determined label content, in some embodiments.

At block 1050, the method 1000 provides printing instructions for a customized crayon label based on the determined label content. In some embodiments, a label generating component might provide printing instructions to a printing component. In further embodiments, a printing component might print a customized crayon label based on received printing instructions.

Figure 11:
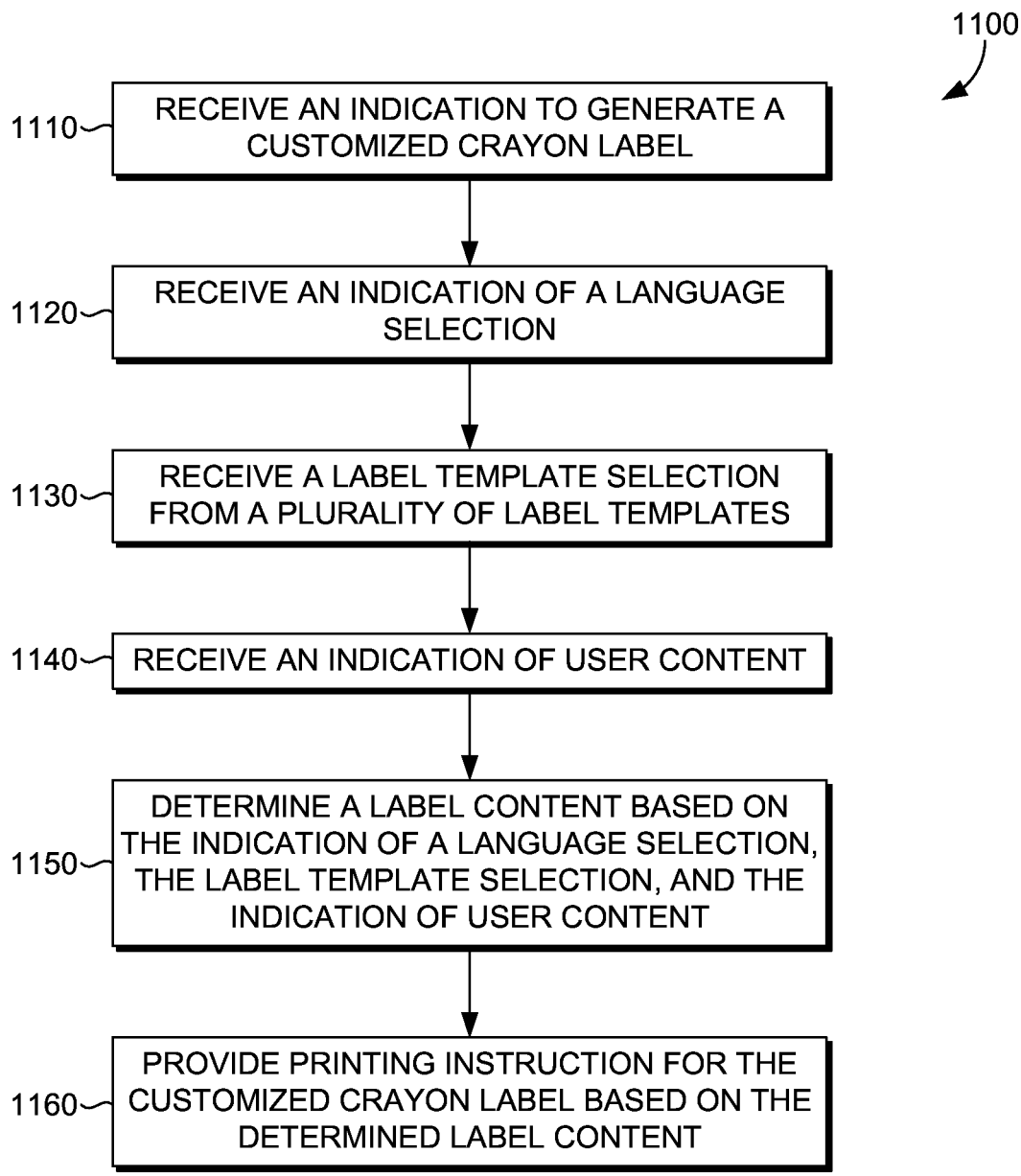
FIG. 11 is an illustrative flow chart of a method for generating a customized crayon label, in accordance with an embodiment of the invention.

FIG. 11 presents a flow chart directed to a method 1100 for generating a customized crayon label. Initially, at block 1110, the method 1100 includes receiving an indication to generate a customized crayon label. The indication may correspond to the insertion of a token by a user as previously described with respect to exemplary FIG. 1, in one embodiment. In other embodiments, the indication might correspond to a user pressing a physical button or a touchscreen that displays a virtual button where a portion of the touchscreen corresponds to the virtual button. The indication may indicate a user response to an instruction and/or prompt displayed via a user interface component configured to receive information from an interactive component having a GUI, such as a touch-screen display component, in some embodiments. A prompt might include a phrase (e.g., "Insert Token") in English, Spanish, and/or Portuguese, for example, presented using a touch-screen display component, in embodiments. In another embodiment, the phrase "Insert Token" or equivalent words may be displayed to a user sequentially in more than one language. For example, the phrase "Insert Token" may be communicated (e.g., displayed via a GUI as a virtual button) to a user first in English followed by the communication of an equivalent phrase in Spanish (e.g., replacing the English phrase), and subsequently followed by the communication of an equivalent phrase in Portuguese (e.g., replacing the Spanish phrase) such that the phrase is communicated to the user in one language at a time and the phrase is cycled through a plurality of a languages. In further embodiments, the phrase "Insert Token" might "flash" on a GUI in each language, sequentially and consecutively, for a fun visual effect. In another embodiment, a prompt might be displayed simultaneously in English, Spanish, and Portuguese. In this way, a user may be prompted to interact with a customized crayon label generating system without requiring an initial language selection, wherein a user interaction results in receipt of an indication to generate a custom crayon label, in embodiments. The phrase might be accompanied by visually exciting graphics or animations, such as, for example, an animation of a token being inserted into a token receiving slot. In some embodiments, a user interface component and/or an interactive component might communicate the indication to generate a custom crayon label to an activation component.

The method 1100 might include providing one or more language options to a user via a user interface component in response to receiving the indication to generate a custom crayon label, in further embodiments. In one embodiment, the method 1100 might include presenting a plurality of virtual user-selectable buttons via a user interface component, wherein each virtual user-selectable button corresponds to a different or distinct language option. A first user-selectable button corresponding to the English language might display the text "English" and/or an American flag, whereas a second user-selectable button corresponding to the Spanish language might display the text "Español" and/or a Spanish flag, in one embodiment. In a further embodiment, a third user-selectable button corresponding to the Portuguese language might display the text "Portugûes" and/or a Portuguese flag, for example. Accordingly, a user might interact with a user interface component, in some embodiments, in order to select a language option and thus indicate a language preference. Words, text, pictures, icons, animations, and/or graphics that identify and otherwise communicate a language option to a user are contemplated to be within the scope of this disclosure. As such, the method 1100 described herein should not be construed as limited solely to the illustrative examples that are expressly provided.

The method 1100 continues at block 1120, wherein an indication of a language selection is received. The indication of the language selection might correspond to a user's selection of a language option, in some embodiments. For example, the indication might represent a user preference for one selected language option chosen from a plurality of simultaneously displayed, selectable language options (e.g., virtual buttons) communicated to a user via a user interface component. Generally, the indication of the language selection corresponds to a language in which a user wishes to interact with a crayon label generating system, for example. In some embodiments, the indication of the language selection might be a language identifier entered as text via a user interface component (e.g., a touch-screen display component having a GUI displaying a virtual keyboard) and/or another input component (e.g., a physical keyboard, a mouse, a microphone, etc.). The indication of the language selection and/or a language identifier might be useable by a crayon label generating system and/or components thereof to perform the method 1100, in embodiments. A language identifier refers generally to one or more words, terms, or characters that describe and/or uniquely identify a language. Further, a language identifier might specify a dialect of a language that includes several different dialects, in further embodiments. For example, "Español" may be a language identifier that uniquely describes the Spanish language. In another example, "Español—Mexico" might be a language identifier that uniquely identifies a dialect of the Spanish language that is specific to the country of Mexico. In yet another example, "Portugûes—Brasil" might be a language identifier that uniquely describes the Portuguese language as commonly utilized in and associated with the country of Brazil.

In some embodiments, the indication of a language selection might be received by a user interface component and used to determine a language in which instructions and/or prompts may be configured and communicated (e.g., displayed on a GUI or played through speakers) to a user. For example, the indication of a language selection might be utilized to generate user interfaces for subsequent presentation or communication to a user in a language that corresponds to the language selection. In a further example, the indication of a language selection might be communicated and/or provided to a label generating component that controls a language in which at least a portion of a customized crayon label may be generated. Upon receiving an indication of a language selection, in some embodiments, the method 1100 might include providing any number of subsequent user interfaces to a user, wherein at least a portion of each subsequent user interface utilizes a language corresponding to the indication of the language selection. In such embodiments, subsequent user interfaces communicate instructions and/or prompts in the corresponding language via a user interface component. The exemplary user interfaces shown in each of FIGS. 2 through 5 might be displayed to a user in a language other than English when the language section indicates Spanish, for example. In embodiments, a user interface component might present a user interface subsequent to the indication of the language selection that instructs a user to choose a crayon label template, for example, as previously described with respect to exemplary FIG. 3, such that the instruction is communicated in a language corresponding to the indication.

Next, the method 1100 includes receiving a label template selection, shown at block 1130. In embodiments, a selection of a label template is received via a user interface component (e.g., a touch-screen display component) and/or other input components (e.g., a touchpad or microphone), as previously described with respect to illustrative FIG. 9. The method 1100 may further include, in embodiments, receiving an indication of user content at block 1140. An indication of user content might include a selection of a label template, user input including user content, user input information regarding a recipient of a customized crayon label, a user selection of a theme, or a combination thereof, for example. The user content might be input using a virtual or physical keyboard that enables a user to input text using letters, symbols, and/or characters, in embodiments. In further embodiments, a virtual keyboard or a physical keyboard is dynamically adapted to provide letters, symbols, and/or characters that correspond to the indication of a language selection previously received. The user content might, in some embodiments, be entered by a user using a language that corresponds to the language selection received without a keyboard, in some embodiments. For example, speech in the corresponding language might be input for recognition using a microphone. In another example, sign language might be input for recognition by a camera with gesture recognition capabilities. Additionally and/or alternatively, other input/output components might be employed to receive or capture user content as input or provided by a user.

At block 1150, the method 1100 continues with determining a label content based on the indication of a language selection, the label template selection, and the indication of user content, in embodiments. For example, the indication of a language selection might be used to determine what user content and/or how the user content might be incorporated into a previously selected label template. As previously described with respect to exemplary FIG. 9, for example, a label generating component might determine the label content, in further embodiments. In yet further embodiments, a label generating component might insert, integrate, and/or incorporate one or more items of user content or indications thereof into a selected label template (e.g., an automatically selected label template, a default template, or a user-selected template) that includes a fillable portion which controls placement, orientation, and/or alignment of the user content as included within the selected label template. In some embodiments, a label size, font size, character number, shape, placement, orientation, and/or alignment of a fillable portion of a selected template might be determined or affected by the language selection. For example, a particular first font might be automatically used for a first language selection. In another example, a second font might only be available for a portion of the available language selections (e.g., available for Spanish and Portuguese but unavailable for English). In yet another example, a language selection that indicates a character-based language might change the placement and orientation of a fillable portion (e.g., selection of the Chinese language might orient a fillable portion to be read from the top to the bottom of a crayon label, whereas a selection of English might orient a fillable portion to be easily read from the left to the right). In embodiments, the method 1100 includes providing printing instructions for a customized crayon label that represents, corresponds to, or otherwise includes the determined label content, shown at block 1160. Printing instructions may generally account for the language selection such that at least a portion of the customized crayon label includes user content expressed in a language indicated by the language selection, in embodiments. Further, the printing instructions might include language-specific instructions for printing the customized crayon label, in some embodiments.

Figure 12:
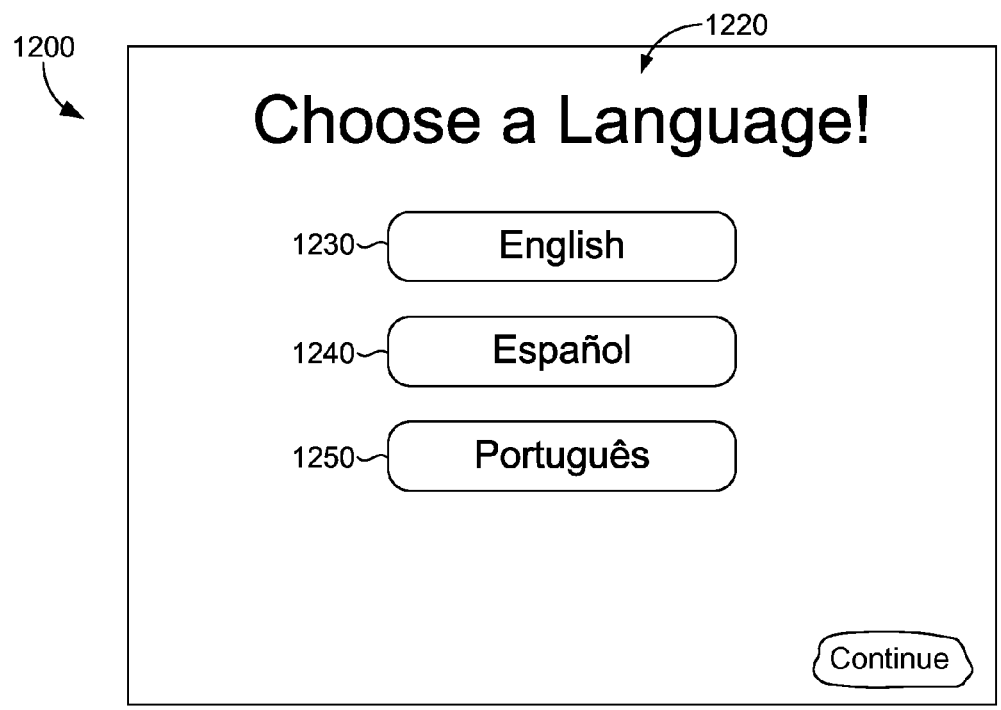
FIG. 12 is an exemplary user interface for generating a customized crayon label, in accordance with an embodiment of the invention.

Turning to FIG. 12, an exemplary user interface 1200 for generating a customized crayon label, in accordance with an embodiment of the invention is provided. In the example of FIG. 12, the user interface 1200 is a GUI for prompting a user to select a language option from a plurality of language options in order to indicate a preferred language for interacting with a custom crayon label generating system. In embodiments, the user interface 1200 may communicate a message, tagline, and/or headline 1220 (e.g., "Choose a Language") to engage a user and elicit a user selection of a language option, for example, as previously described with regard to the exemplary method of FIG. 11. The headline 1220 might be displayed in a default language, or alternatively, might be displayed in more than one language, in embodiments. In some embodiments, the headline 1220 might be displayed sequentially in more than one language such that the headline 1220 cycles through two or more languages, one language at a time. The user interface 1200 might display any number of a plurality of different language options to a user via a user interface component, in embodiments. Exemplary language options include "English" 1230, "Español" 1240, and "Portugûes" 1250, as shown in the exemplary user interface shown in FIG. 12. Each language options may be presented in a corresponding language on the user interface 1200, in embodiments. In one example, a French language option might be displayed as "Français" and the German language option might be displayed as "Deutsch." Any number of language options might be included in the user interface 1200.

Figure 13:
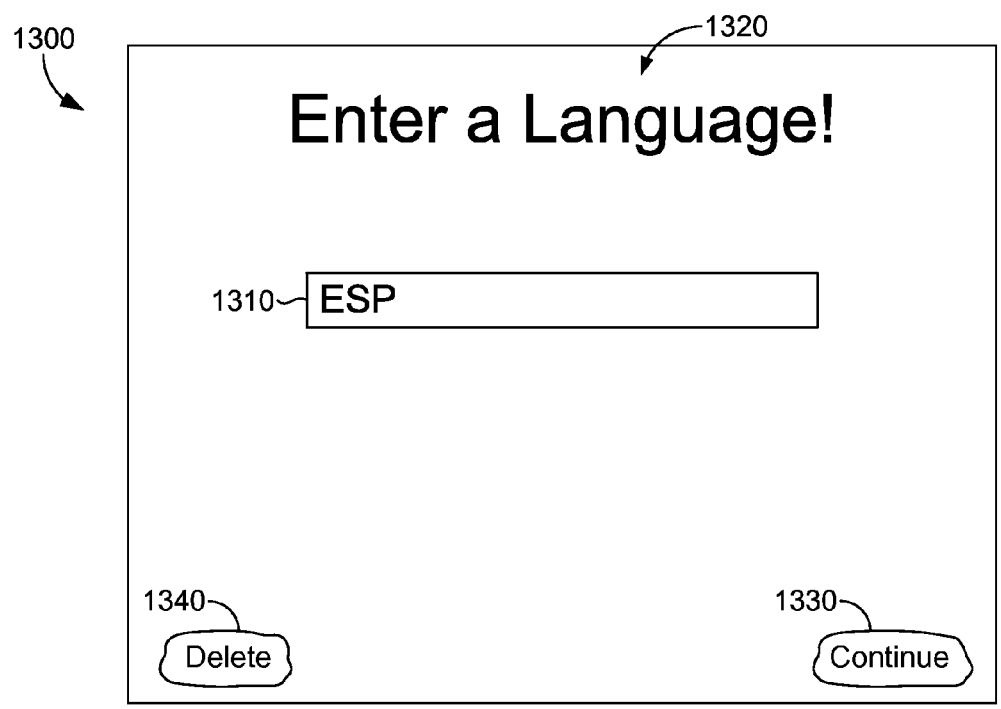
FIG. 13 is an exemplary user interface for generating a customized crayon label, in accordance with an embodiment of the invention.

In an alternative embodiment shown in FIG. 13, a user interface 1300 might include an input box 1310 configured to receive and display textual user input such as a language identifier, for example. In some embodiments, a user might use a virtual or physical keyboard, for example, to input or enter a language identifier. As illustrated in exemplary FIG. 13, the input box 1310 includes a portion (e.g., "ESP") of a language identifier entered or input by a user in response to a headline 1320 (e.g., "Enter a Language!"). The user interface 1300 might include a selectable "Delete" option 1340, which applies a deletion function to user input in the input box 1310, in some embodiments. As such, a user might select the "Delete" option 1340 to remove one or more entered letters, for example, from the input box 1310. Other modification options might be presented in the user interface 1300, such as an autocomplete function that automatically identifies a portion of a language identifier during user entry, in real time or near real time, in further embodiments. In yet further embodiments, modification options might include an autocorrect function that automatically corrects the spelling of a language identifier. Additionally or alternatively, an autocomplete function and an autocorrect function might operate in tandem, in further embodiments. Once a user has finished entering a language identifier, the user might select a "Continue" option 1330 of the user interface 1300 in order to continue a method for generating a customized crayon label, in embodiments.

One or more of the exemplary user interfaces 1200 and 1300 guiding language options might be displayed to a user subsequent to exemplary user interface 200 shown in FIG. 2, in some embodiments. Additionally or alternatively, one or more of the exemplary user interfaces 1200 and 1300 might be presented to a user prior to exemplary user interfaces 300 and 400, in further embodiments. Language selection options may generally be configured to be selectable, in embodiments. In response to receiving an indication of a language selection, subsequent user interfaces might include prompts and/or instructions that utilize a language corresponding to the language selection, in some embodiments. For example, the headline 310 of FIG. 3 might be presented in Spanish or Portuguese, in embodiments. In another example, a portion of the user content 420 of FIG. 4 might be presented in French or English. Additional user instructions are not described herein for brevity, but further instructions and variations on the user interfaces described herein are contemplated to be within the scope of this description. The examples of languages set forth herein are also illustrative in nature and should not be construed as limiting. Any number of languages may be considered to be within the scope of this disclosure, including languages expressed in characters (e.g., Chinese), for example.

Figure 14:
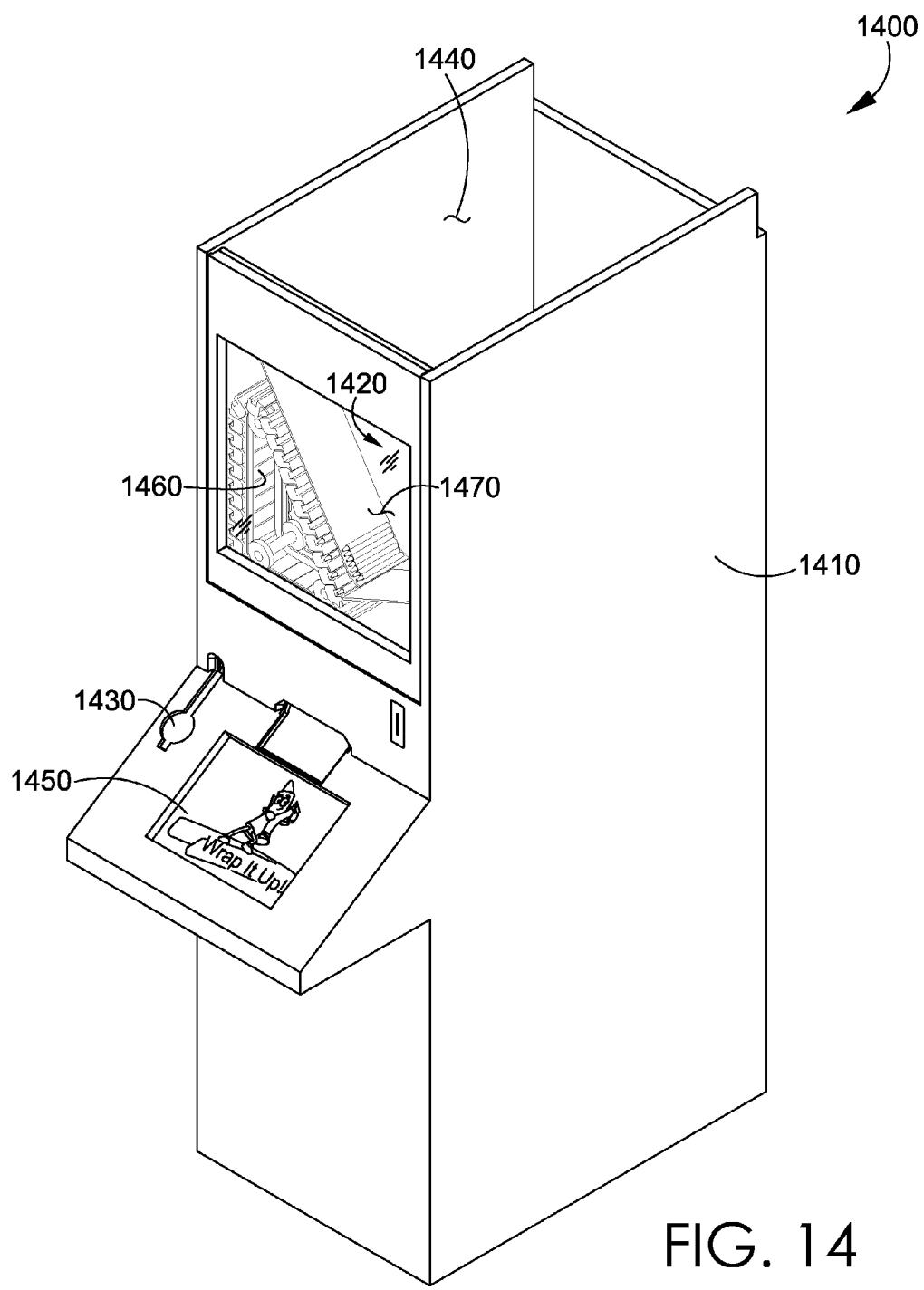
FIG. 14 is a front, perspective view of a system for generating a customized crayon label, in accordance with an embodiment of the invention.

In embodiments, methods for generating a customized crayon label may be implemented using the exemplary system of FIG. 6 and/or the exemplary system shown in FIG. 14. As should be apparent, exemplary system 1400 includes some components that may be the same or similar to components of exemplary system 600, previously described with reference to FIG. 6. Accordingly, the components of exemplary system 1400 are not discussed herein at length, but rather, are considered to incorporate at least a portion of the features and aspects of the components of exemplary system 600. However, system 600 should not be construed as limiting the system 1400 of FIG. 14.

Figure 15:
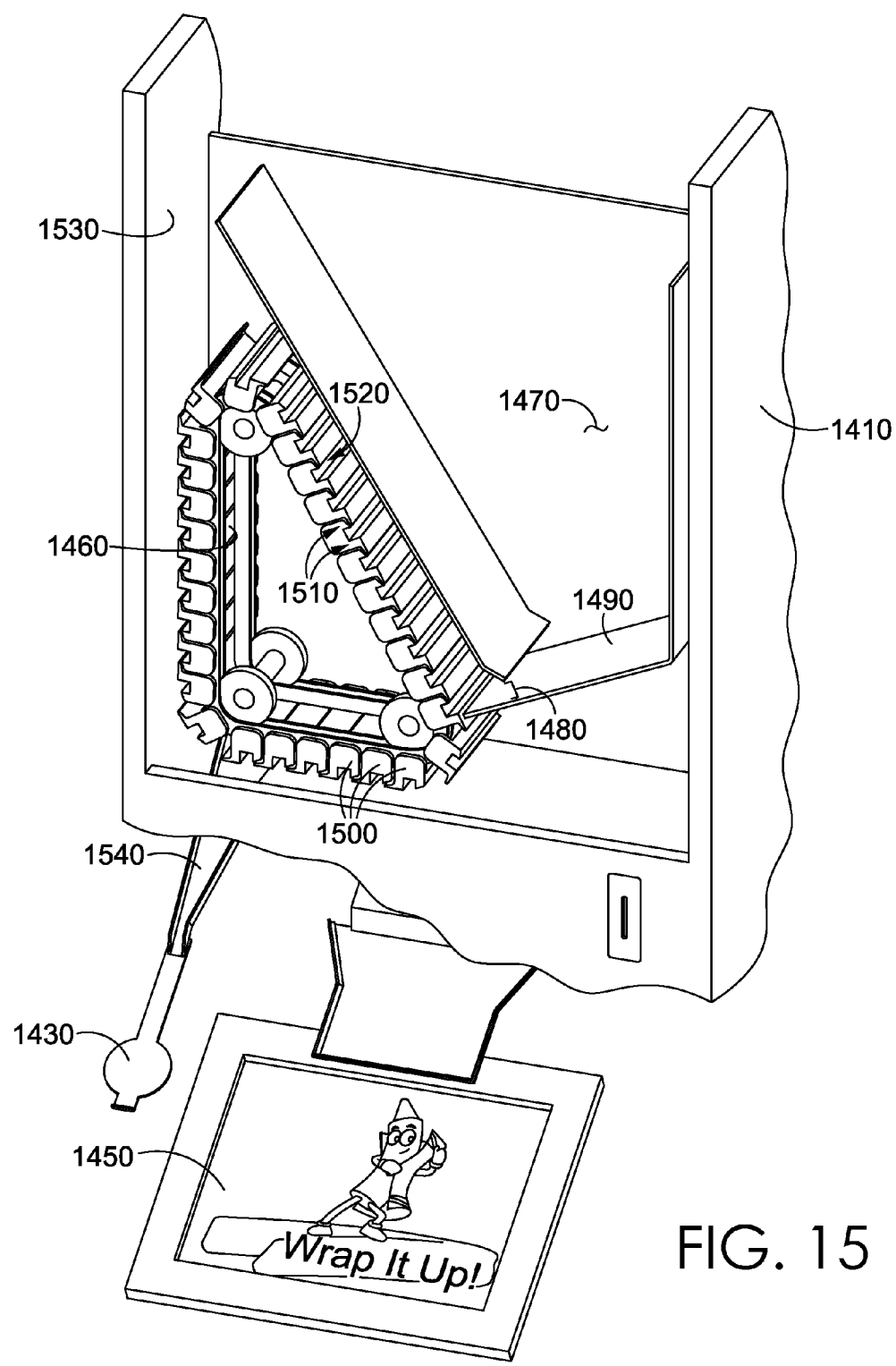
FIG. 15 is a detailed view of a front, perspective of a portion of the system of FIG. 14, in accordance with an embodiment of the invention.

FIG. 14 is a front, perspective view of a crayon label generating and dispensing system 1400, and FIG. 15 is a front, interior perspective view of an interior portion of the system of FIG. 14. In FIG. 14, the system 1400 includes a housing 1410 with a viewing window 1420. The viewing window 1420 may be a transparent or semi-transparent material that may be integrated with the housing 1410 in order to reveal internal aspects of the system 1400 when viewed from the exterior of the housing 1410, in some embodiments. Alternatively, a portion of the housing 1410 might be removed or replaced with the viewing window 1420 comprising a transparent or semi-transparent material to reveal internal aspects of the system 1400 when viewed from the exterior of the housing 1410, in embodiments. The viewing window 1420 may enhance and enrich a user experience with the system 1400 by providing a clear view of at least some internally placed components or other mechanisms within the system 1400, generally. For example, a user may watch as a crayon body travels through the system 1400 to be dispensed to a crayon receptacle 1430 that is externally accessible. A user may enjoy watching the progress of a crayon traveling through the system 1400. Accordingly, the size, shape, placement, and number of viewing windows might be determined or based on the location of moving parts or visually interesting mechanisms located within the interior of the housing 1410 of the system 1400 so that said parts or mechanisms are easily viewed by a user from the exterior of the housing 1410.

Further, the housing 1410 may include an opening 1440 placed at or near the top of the housing 1410, in some embodiments. The opening 1440 enables heat to escape the housing 1410 in order to prevent a temperature within the housing 1410 of the system 1400 from negatively affecting crayon bodies (e.g., melting and/or discoloration) stored therein. A user interface component 1450, a printing component (not shown), or other electronic parts, for example, may generate or emanate heat that would otherwise build up within the housing 1410 and raise the internal temperature of the system 1400. A high internal temperature may negatively or detrimentally affect crayon bodies, system components, and performance thereof, for example. The size, shape, and location of the opening 1440 should not be construed as limiting, as additional openings of various sizes, shapes, and locations are contemplated to be within the scope of this disclosure. As illustrated in FIG. 14, the exemplary opening 1440 is placed at or near the top of the housing 1410 to exploit the fact that heat rises. In another embodiment, the housing 1410 might include a plurality of openings of a size, shape, and/or placement that correspond to the size, shape, and/or placement of one or more heat-producing components stored within the housing 1410 of the system 1400. Accordingly, opening 1440 may be configured and/or placed to maximize or increase heat dissipation.

In embodiments, the system 1400 might include components in addition to those described with respect to the exemplary system 600 of FIG. 6. In some embodiments, the system 1400 may include a conveyor component 1460 and a hopper 1470. The hopper 1470 may generally be configured to store crayon bodies in an orderly fashion. For example, the hopper 1470 might store a plurality of crayon bodies in a single, specific or defined orientation, in some embodiments. For example, a first defined orientation might include storing a crayon body in a lengthwise fashion such that a plurality of crayons stored within the hopper 1470 abut one another lengthwise along the rounded side of the crayon body. In further embodiments, the hopper 1470 might have a depth (e.g., measured in inches) that approximates the standard length of crayon bodies such that the plurality of crayon bodies stored therein remain in a single, defined orientation as the plurality of crayon bodies move through the hopper 1470. In embodiments, crayon bodies may be loaded into the hopper 1470 at the top of the housing 1410, and crayon bodies may be dispensed at or near the bottom of the hopper 1470. Accordingly, crayon bodies, in some embodiments, move through the hopper 1470 in a top-down direction.

Additionally, the hopper 1470 may be configured to exploit the round side of some crayon bodies such that crayon bodies may roll out of the hopper 1470 using an opening 1480 placed near the bottom of the hopper 1470, in further embodiments. The bottom of the hopper 1470 might include or incorporate an incline 1490 placed adjacent the opening 1480, in embodiments. Generally, the incline 1490 may direct the movement of crayon bodies down the incline 1490 and toward the opening 1480. In further embodiments, the opening 1480 might have dimensions that mimic the shape of a crayon body. In yet further embodiments, the opening 1480 might have dimensions that control how many crayon bodies may roll out of the hopper 1470 through the opening 1480 at a given time. For example, the opening 1480 might have a height and length that approximates the profile of a single crayon body such that one crayon body may roll out of the opening 1480 at a time. In addition, the opening 1480 might have dimensions that prevent a crayon body that is misaligned from the particular orientation from being dispensed, in some embodiments. For example, the opening 1480 might have a height and length that corresponds to the profile of a crayon body as placed in the desired orientation in the hopper 1470. The hopper 1470, the opening 1480, and the incline 1490 may move crayon bodies from the hopper 1470 and out the opening 1480 using: the weight of a plurality of crayon bodies stored in hopper 1470 (e.g., gravity pushing down on stored crayon bodies), the defined orientation of crayon bodies stored in the hopper 1470, the dimensions and/or shape of the hopper 1470, the dimensions and/or shape of the opening 1480, the placement and degree of the incline 1490, an agitation component, or a combination thereof.

The conveyor component 1460 may generally be configured to receive a crayon body from the hopper 1470 and transport said crayon body. Crayon bodies may be dispensed from the hopper 1470 and received by the conveyor component 1460, in embodiments. Alternatively, the conveyor component 1460 might have a size and/or shape configured to pluck one crayon at a time from the hopper 1470, opening 1480, and/or incline 1490, in some embodiments. In embodiments, the conveyor component 1460 transports one or more crayon bodies and dispenses the crayon bodies, one at a time, to a crayon receptacle 1430 that opens to the exterior of the housing 1410. The conveyor component 1460 might be configured to securely transport a plurality of crayon bodies at one time, but only dispense one crayon body one at a time, in some embodiments. In other embodiments, the conveyor component 1460 might be configured to securely transport and dispense only one crayon body at a time.

Generally, the conveyor component 1460 may be a continuous conveyor belt that forms a loop. As such, the conveyor component 1460 may transport crayon bodies in a path that is a loop beginning and ending at the opening 1480 of the hopper 1470, for example. The loop of the conveyor component 1460 might include a plurality of consecutive but discrete links 1500 integrated with or attached to a continuous conveyor belt, in some embodiments. Such discrete links 1500 might be spaced at even intervals along a continuous conveyor belt of the conveyor component 1460 in further embodiments. In one embodiment, each of the discrete links 1500 might include at least two raised, outer ledges 1510. The spacing 1520 between the at least two raised, outer ledges 1510 of each of the plurality of links 1500 may be shaped so as to accommodate or hold a crayon body therein. Generally, the ledges 1510 and the spacing 1520 face outward from a belt of the conveyor component 1460. A crayon body is held within the spacing 1520 such that the ledges 1510 might abut one or more sides of the crayon body, or may be described as flanking the crayon body, for example. In further embodiments, the dimensions of the spacing 1520 between the ledges 1510 of a link 1500 might be the same or similar to the dimensions of the opening 1480 of the hopper 1470, such that a link might receive a crayon body from the opening 1480 of the hopper 1470, wherein the crayon body remains in the defined orientation. Further, the at least two raised, outer ledges 1510 of each of the plurality of links 1500 may securely capture a crayon body such that a round-sided crayon body is prevented from rolling off of the conveyor component 1460, in embodiments. For example, the ledges 1510 act as a "roll guard." Any number of ledges may be employed by the plurality of links 1500 described herein. In one example, each of the plurality of links 1500 might include two ledges 1510 configured to securely transport one crayon body. In another example, each link might include two outer ledges and one middle ledge, which together are configured to securely transport two crayon bodies. In yet another example, a portion of the plurality of links 1500 includes two ledges whereas another portion includes three ledges. The conveyor component 1460 might include any number and type of consecutive, discrete links along a belt forming a loop, in embodiments.

In another embodiment, the conveyor component 1460 includes a continuous belt having a surface with a plurality of recesses. Such recesses might be evenly spaced, irregularly spaced, and/or repeating in some fashion, in further embodiments. In some embodiments, a spacing interval of the recesses might be determined by the size and shape of crayon bodies and/or might depend on a belt type employed by the conveyor component 1460. The recesses may generally be configured to securely transport crayon bodies. Each recess might include dimensions that correspond to the size and shape of a crayon body, and further, might correspond to a profile of the crayon body when placed in the defined orientation, in embodiments. As such, in some embodiments, each recess might be configured to receive one crayon body from the hopper 1470 via the opening 1480 such that the crayon body remains in the defined orientation.

Figure 16:
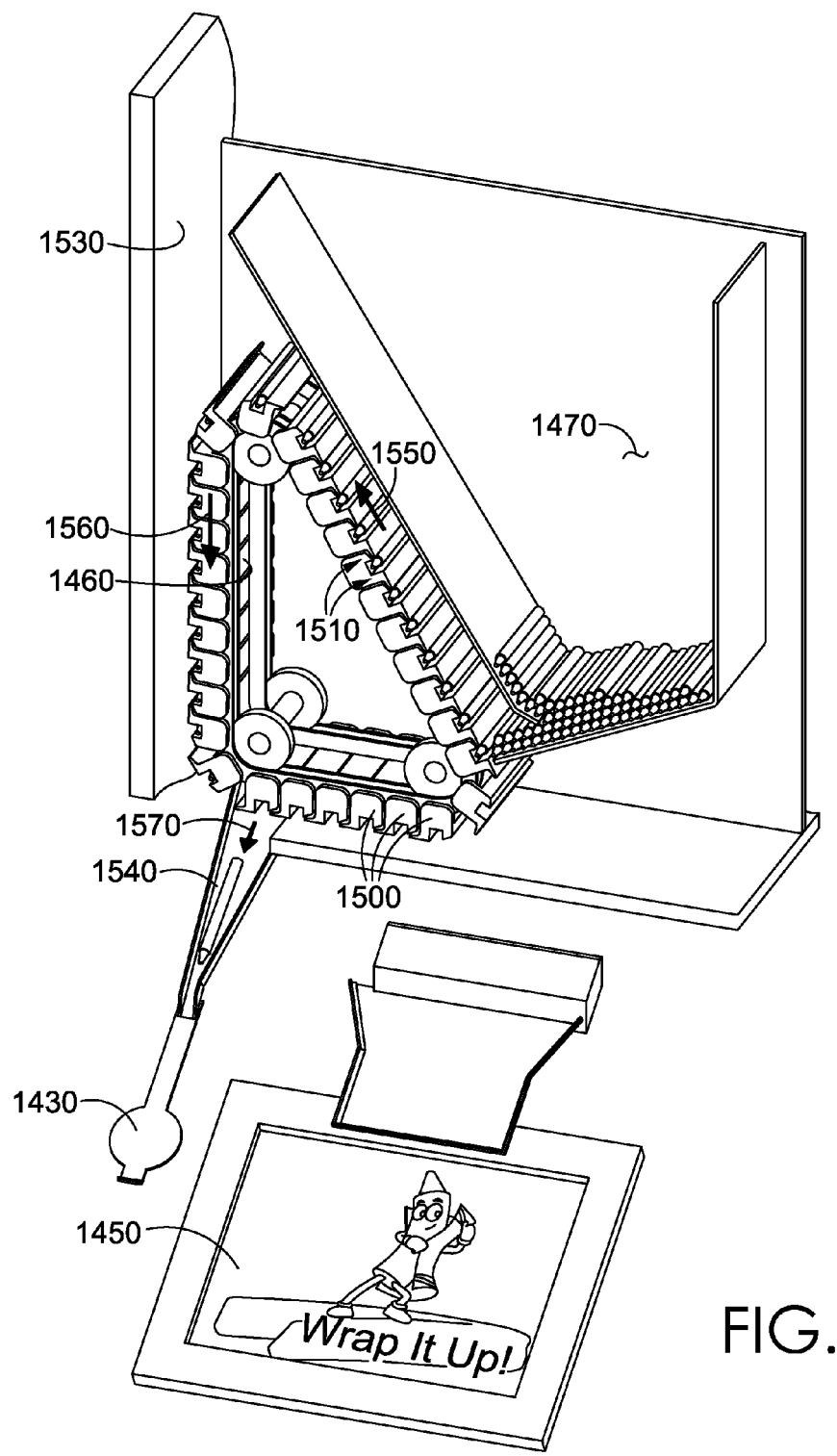
FIG. 16 is a front view of an exemplary system for generating a customized crayon label, in accordance with an embodiment of the invention.

With reference to FIG. 16, once the conveyor component 1460, including recesses or links thereof, has received a crayon body through the opening 1480, the conveyor component 1460, in some embodiments, transports the crayon body as held in place. The crayon body may be transported upwards away from the bottom of the hopper 1470. The crayon body is generally carried upward in the direction indicated by arrow 1550, toward the peak of the path, in embodiments. As indicated in FIG. 16, the path may follow along a wall of the hopper 1470. Upon reaching the upper peak of the path, the belt turns (e.g., a link might pivot in a counterclockwise direction) such that the crayon body may be transported downward in the direction indicated by arrow 1560. During the descent, the spacing 1520 between flanking ledges or a recess may face outward and open toward the housing 1410. In order to prevent the crayon body from falling out from between flanking ledges, or alternatively from a recess, at least one interior surface 1530 of the housing 1410 may be used to hold the crayon body in place, in embodiments. Accordingly, a crayon body may be secured in the spacing 1520 as flanked between the at least two opposite, outer ledges 1510 and as contacting the interior surface 1530 of the housing 1410. Alternatively, one of the ledges might include a lip that aids the retention of a crayon body during transport. Upon reaching the lowest point of the path, the belt turns (e.g., a link might pivot in a counterclockwise direction) such that a recess or the spacing of ledges of a link might face downward such that a crayon body held therein may be released or dropped. At the lowest point of the path of the conveyor component 1460, the crayon body is no longer secured in place using the interior surface 1530 of the housing 1410, for example. In embodiments, the crayon body falls into a chute 1540 at the lowest point of the path. Arrow 1570 indicates the drop or fall direction of a dropped crayon body. The chute 1540 may be configured to capture a released crayon body and enable a crayon body to slide downward to a crayon receptacle 1430 on the exterior of the housing 1410.

Continuing, the system 1400 might include additional components, in comparison to the exemplary system 600 of FIG. 6. In embodiments, the system 1400 of FIG. 14 includes at least one floating roller (e.g., a "dancer" roller or "dancer" bar) that regulates the speed at which labels are fed to a printer of a printing component, in embodiments. Controlling the speed at which labels are fed to a printer prevents missfeeds, jams, and/or crooked printing results, for example. At a high level, labels are unwound from the roll of labels, passed around the floating roller, and subsequently fed to a printer, in some embodiments. In embodiments, the floating roller generally reduces the negative impacts of rapid changes in feed speed (e.g., jerky or abrupt changes) along the path from the roll of labels to the printer. As such, the floating roller may provide a smooth and controlled feed of the labels to a printer. The floating roller may regulate feed speed by moving or "dancing," for example. The floating roller might freely move up, down, back, and/or forward while feeding labels into a printer, in embodiments. The movement of the floating roller might be achieved using one or more springs that react to tension between the unwinding of the roll of labels and uptake of labels at the printer, in further embodiments. For example, one or more springs may absorb abrupt changes in the feed speed of the labels. Accordingly, the floating roller may move or dance by way of the springs in order to dynamically control the feed speed and/or tension, in some embodiments.

In further embodiments, the floating roller may be paired with additional components, such as a roll brake that works in tandem with the floating roller to control the speed at which labels are fed to a printer. In one example, during the process of feeding labels to a printer, the floating roller may move upward such that the roll brake may be released, which reduces tension on the labels fed to a printer. In another example, the floating roller may move downward such that the roll brake may be applied and inhibit or slow the feed of labels to the printer. The movement of the floating roller, and in some embodiments, a roll brake, might dynamically adjust the speed at which labels are fed to a printer. As such, the feed speed for a full roll of labels may be different than the feed speed for a half-full roll of labels because the full roll of labels has a greater diameter and greater circumference than a half-full roll of labels. As diameter and circumference decrease, a roll of labels may turn faster resulting in an increase in feed speed. As the feed speed increases, the floating roller may move downward in order to apply the roll brake and decrease or slow the speed at which labels are fed to the printer in proportion to the changing diameter and circumference of the roll of labels itself. Although exemplary floating rollers have been described hereinabove, additional embodiments of the floating roller are contemplated to be within the scope of this disclosure, and as such, the examples should not be construed as limiting.

Figure 17:
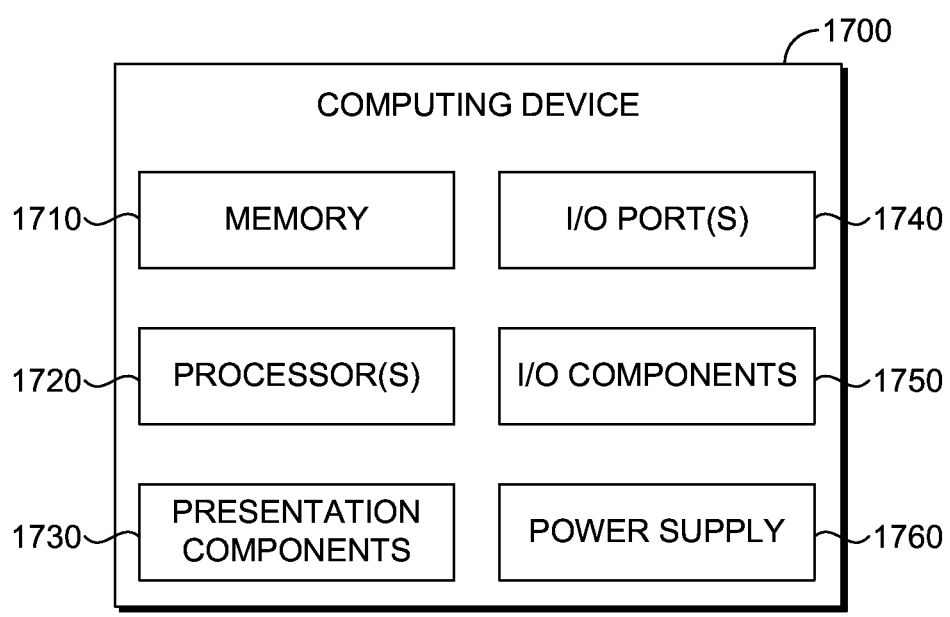
FIG. 17 is an exemplary computing device for use with embodiments of the invention.

With reference to FIG. 17, it depicts an exemplary computing device 1700 for use with embodiments of the invention. The computing device 1700 may be configured for use in implementing embodiments of the present invention. The computing device 1700 may be a computer storage device, such as a personal computer, desktop computer, laptop computer, consumer electronic device, handheld device (e.g., personal digital assistant), various servers, processing equipment, and the like. In embodiments, the computing device 1700 might be configured to perform exemplary methods 900, 1000, and 1100 for example. Additionally or alternatively, the computing device 1700 might be integrated with, and/or configured to communicate with exemplary system 1400, for example. It should be noted however, that the invention is not limited to implementation on the illustrative computing devices listed here, but may be implemented on any of a variety of different types of computing devices within the scope of embodiments of the present invention. Similarly, the computing device 1700 might be integrated with and/or configured to communicate with systems other than illustrative system 1400.

Functionality of the computing device 1700 may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in computing environments 1700 where tasks are performed by remote-processing devices that are linked through a communications network, in further embodiments.

In embodiments, the computing device 1700 includes a bus that directly or indirectly couples the following devices: a memory 1710, one or more processors 1720, presentation component(s) 1730, input/output (I/O) port(s) 1740, I/O component(s) 1750, and a power supply 1760. The bus represents what may be one or more busses (such as an address bus, data bus, or combination thereof). Further, the computing device 1700 typically includes a variety of computer-readable media. Computer-readable media may be any available media that can be accessed by computing device 1700 and includes both volatile and nonvolatile media, removable and nonremovable media. By way of example, and not limitation, computer-readable media may comprise computer storage media and communication media. Computer storage media includes both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 1700.

Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 1710 includes computer storage media in the form of volatile and/or nonvolatile memory. The memory may be removable, nonremovable, or a combination thereof. Exemplary hardware devices include solid-state memory, hard drives, optical-disc drives, etc. The computing device 1700 includes one or more processors that read data from various entities such as memory 1710 or I/O components 1750. Presentation component(s) 1730 present data indications to a user or other device. Exemplary presentation components include a display device, speaker, printing component, vibrating component, etc. I/O ports 1740 allow computing device 1700 to be logically coupled to other devices including I/O components 1750, some of which may be built in. Illustrative I/O components include buttons, a microphone, joystick, game pad, touch interface, scanner, printer, wireless device, etc., and may be built in or external.

It should be understood and appreciated that the exemplary computing device 1700 shown in FIG. 17 is merely an example of one suitable computing environment and is not intended to suggest any limitation as to the scope of use or functionality of the present invention. Neither should the exemplary system architecture be interpreted as having any dependency or requirement related to any single component or combination of components illustrated therein.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A customized crayon label creation and dispensing system, the system comprising:
an activation component;
a user interface component;
a label generating component;
a printing component; and
a crayon dispensing component,
wherein in response to a token received by the activation component and one or more indications received by the user interface component,
(1) at least one customized crayon label is generated by the label generating component, and
(2) at least one crayon body and the at least one customized crayon label are dispensed by the system.

2. The system of claim 1, wherein the one or more indications received by the user interface component comprises one or more of a template selection and at least one item of user content.

3. The system of claim 2, wherein the at least one customized crayon label comprises one or more of the template selection and the at least one item of user content.

4. The system of claim 2, wherein the at least one item of user content comprises one or more of alphanumeric characters, punctuation marks, symbols, ideograms, spaces, and emoji.

5. The system of claim 1, wherein the user interface component further comprises at least one of a graphical user interface and a user input component.

6. The system of claim 1, wherein the crayon dispensing component further comprises at least one of an agitation component and a dispensing mechanism.

7. The system of claim 1, wherein the printing component further comprises at least one of a label feeding component and a label dispensing component.

8. The system of claim 1, wherein in response to a token received by the activation component, instructions for one or more of selecting a template and entering one or more items of user content are provided.

9. The system of claim 1, wherein in response to generation of at least one customized crayon label by the label generating component, instructions for manually affixing the dispensed label to the dispensed crayon are provided.

10. The system of claim 1, wherein the activation component comprises at least one of a token receiving component, a scanning component, a radio frequency identification component, a magnetic strip reading component, a speech recognition component, a voice activity detection component, a motion sensing component, a capacitive sensing component, and a near field communication component.

11. A customized crayon label creation and dispensing device, the device comprising:
    an activation component for recognizing an indication of activation;
    a user interface component for prompting user interaction with the system and for receiving an indication of content;
    a label generating component for incorporating content into a label template;
    a printing component that comprises a label feeding component and a label dispensing component; and
    a crayon dispensing component that comprises an agitation component and a dispensing mechanism,
    wherein in response to the activation component recognizing the indication of activation and the user interface component receiving the indication of content,
    (1) at least one customized crayon label is generated by the label generating component,
    (2) the at least one customized crayon label is dispensed via the printing component, and
    (3) at least one crayon body is dispensed via the crayon dispensing component.

12. The device of claim 11, wherein the activation component recognizes an indication of activation including receiving a token, swiping a card, or detection by a motion-sensor, and in response, initiates crayon label customization.

13. The device of claim 11, wherein the user interface component receives one or more indications of content including one or more of a user selection of a predetermined label template, a user selection of a predetermined message, or an input of user-originated content.

14. The device of claim 11, wherein the label generating component associates an indication of content with a predetermined area of a template.

15. The device of claim 11, wherein the label generating component incorporates content into a label template by populating one or more fillable portions of the label template with at least a portion of content.

16. The device of claim 11, wherein the agitation component is configured to release stored crayon bodies in a predetermined orientation.

17. The device of claim 11, wherein the agitation component of the crayon dispensing component further comprises a hopper.

18. The device of claim 17, wherein the dispensing mechanism of the crayon dispensing component further comprises a belt and a chute, the belt configured to transport the at least one crayon body from to a hopper to the chute, and the chute configured to transport the at least one crayon body to user-accessible crayon receptacle.

19. The device of claim 11, wherein the dispensing mechanism further includes a conveyor component, wherein the conveyor component receives the at least one crayon body from the agitation component.

20. The device of claim 19, wherein the conveyor component includes a plurality of links, each link configured to receive the at least one crayon body.

* * * * *